US011489332B2

(12) United States Patent
Danilovic et al.

(10) Patent No.: US 11,489,332 B2
(45) Date of Patent: Nov. 1, 2022

(54) PROTECTION CIRCUITS FOR WIRELESS POWER RECEIVERS

(71) Applicant: WiTricity Corporation, Watertown, MA (US)

(72) Inventors: Milisav Danilovic, Watertown, MA (US); Morris P. Kesler, Bedford, MA (US); Conor Rochford, Newton, MA (US)

(73) Assignee: WITRICITY CORPORATION, Watertown, MA (US)

( * ) Notice: Subject to any disclaimer, the term of this patent is extended or adjusted under 35 U.S.C. 154(b) by 343 days.

(21) Appl. No.: 16/882,117

(22) Filed: May 22, 2020

(65) Prior Publication Data

US 2020/0373768 A1    Nov. 26, 2020

Related U.S. Application Data

(60) Provisional application No. 62/852,666, filed on May 24, 2019.

(51) Int. Cl.
*H02H 7/22* (2006.01)
*H02J 50/12* (2016.01)
(Continued)

(52) U.S. Cl.
CPC .............. *H02H 7/22* (2013.01); *H02J 7/0031* (2013.01); *H02J 7/0036* (2013.01);
(Continued)

(58) Field of Classification Search
CPC .... H02H 7/22; H02J 7/00302; H02J 7/00304; H02J 7/00308; H02J 7/0031; H02J 7/0036;
(Continued)

(56) References Cited

U.S. PATENT DOCUMENTS 5,640,082 A    6/1997 Lusher et al.
5,784,269 A    7/1998 Jacobs et al.
(Continued)

FOREIGN PATENT DOCUMENTS

CN    103414255 A    11/2013
CN    110103742 A    8/2019
(Continued)

OTHER PUBLICATIONS

U.S. Appl. No. 16/882,136 Published as: US2020/0373752 A1, Protection Circuits for Wireless Power Receivers, filed May 22, 2020.
(Continued)

*Primary Examiner* — Stacy Whitmore
(74) *Attorney, Agent, or Firm* — Goodwin Procter LLP

(57) ABSTRACT

Exemplary protection circuitry for wireless power systems can include a battery disconnect circuit, a load dump protection circuit, and/or a coil disconnect circuit. One or more of these protection circuits may be employed by a wireless power receiver. Further, one or more of these protection circuits may enable a wireless power receiver to be able to protect itself independently from a wireless power transmitter, thereby increasing safety of the wireless power system.

20 Claims, 23 Drawing Sheets

(51) Int. Cl.
*H02J 50/80* (2016.01)
*H02J 7/00* (2006.01)
*H02M 3/335* (2006.01)

(52) U.S. Cl.
CPC ...... *H02J 7/00302* (2020.01); *H02J 7/00304* (2020.01); *H02J 7/00308* (2020.01); *H02J 50/12* (2016.02); *H02J 50/80* (2016.02); *H02M 3/33576* (2013.01)

(58) Field of Classification Search
CPC .......... H02J 50/12; H02J 50/80; H02J 7/0029; H02M 3/33576
See application file for complete search history.

(56) References Cited

U.S. PATENT DOCUMENTS

| | | | |
|---|---|---|---|
| 6,037,745 | A | 3/2000 | Koike et al. |
| 6,483,730 | B2 | 11/2002 | Johnson, Jr. |
| 7,276,886 | B2 | 10/2007 | Kinder et al. |
| 7,333,349 | B2 | 2/2008 | Chang et al. |
| 7,440,300 | B2 | 10/2008 | Konishi et al. |
| 7,535,133 | B2 | 5/2009 | Perreault et al. |
| 8,830,710 | B2 | 9/2014 | Perreault et al. |
| 9,461,714 | B2 | 10/2016 | Cook et al. |
| 9,782,092 | B2 | 10/2017 | Zhang |
| 10,027,186 | B2 | 7/2018 | Aikawa et al. |
| 10,076,966 | B2 | 9/2018 | Koizumi et al. |
| 10,090,885 | B2 | 10/2018 | Widmer et al. |
| 10,141,788 | B2 | 11/2018 | Karnstedt et al. |
| 10,218,224 | B2 | 2/2019 | Campanella et al. |
| 10,343,535 | B2 | 7/2019 | Cook et al. |
| 10,418,841 | B2 | 9/2019 | Danilovic et al. |
| 10,461,587 | B2 | 10/2019 | Sieber |
| 10,651,688 | B2 | 5/2020 | Karnstedt et al. |
| 10,673,282 | B2 | 6/2020 | Campanella et al. |
| 11,017,942 | B2 | 5/2021 | Rochford et al. |
| 2003/0169027 | A1 | 9/2003 | Croce et al. |
| 2007/0064457 | A1 | 3/2007 | Perreault et al. |
| 2007/0222542 | A1 | 9/2007 | Joannopoulos et al. |
| 2008/0265995 | A1 | 10/2008 | Okamoto et al. |
| 2008/0278264 | A1 | 11/2008 | Karalis et al. |
| 2010/0141042 | A1 | 6/2010 | Kesler et al. |
| 2010/0237709 | A1 | 9/2010 | Hall et al. |
| 2010/0295506 | A1 | 11/2010 | Ichikawa |
| 2011/0074346 | A1 | 3/2011 | Hall et al. |
| 2011/0116290 | A1 | 5/2011 | Boys |
| 2011/0193416 | A1 | 8/2011 | Campanella et al. |
| 2011/0196544 | A1 | 8/2011 | Baarman et al. |
| 2011/0260865 | A1 | 10/2011 | Bergman et al. |
| 2012/0112535 | A1 | 5/2012 | Karalis et al. |
| 2013/0062966 | A1 | 3/2013 | Verghese et al. |
| 2013/0069441 | A1 | 3/2013 | Verghese et al. |
| 2013/0181724 | A1 | 7/2013 | Teggatz et al. |
| 2014/0035704 | A1 | 2/2014 | Efe et al. |
| 2014/0049118 | A1 | 2/2014 | Karalis et al. |
| 2014/0111019 | A1 | 4/2014 | Roy et al. |
| 2014/0152117 | A1 | 6/2014 | Sankar |
| 2014/0265610 | A1 | 9/2014 | Bakker et al. |
| 2014/0292092 | A1 | 10/2014 | Ichinose et al. |
| 2014/0361636 | A1 | 12/2014 | Endo et al. |
| 2014/0368052 | A1 | 12/2014 | Norconk et al. |
| 2015/0035372 | A1 | 2/2015 | Aioanei |
| 2015/0051750 | A1 | 2/2015 | Kurs et al. |
| 2015/0061578 | A1 | 3/2015 | Keeling et al. |
| 2015/0202970 | A1 | 7/2015 | Huang et al. |
| 2015/0244179 | A1 | 8/2015 | Ritter et al. |
| 2015/0260835 | A1 | 9/2015 | Widmer et al. |
| 2015/0303703 | A1 | 10/2015 | Hayashi et al. |
| 2015/0306963 | A1 | 10/2015 | Van Wiemeersch et al. |
| 2015/0318708 | A1 | 11/2015 | Bartlett |
| 2015/0319838 | A1 | 11/2015 | Bhutta |
| 2015/0323694 | A1 | 11/2015 | Roy et al. |
| 2015/0357826 | A1 | 12/2015 | Yoo et al. |
| 2015/0372516 | A1* | 12/2015 | Na ....................... H02J 7/0029 361/93.9 |
| 2016/0079766 | A1 | 3/2016 | Jeong et al. |
| 2016/0084894 | A1 | 3/2016 | Govindaraj et al. |
| 2016/0187519 | A1 | 6/2016 | Widmer et al. |
| 2016/0218566 | A1 | 7/2016 | Bunsen et al. |
| 2016/0248275 | A1 | 8/2016 | Okidan |
| 2016/0254679 | A1 | 9/2016 | Liu et al. |
| 2016/0308393 | A1 | 10/2016 | Kumar et al. |
| 2017/0093168 | A1 | 3/2017 | Von Novak, III et al. |
| 2017/0117751 | A1 | 4/2017 | Karnstedt et al. |
| 2017/0126069 | A1 | 5/2017 | Martin |
| 2017/0141622 | A1 | 5/2017 | Meichle |
| 2017/0217325 | A1 | 8/2017 | DeBaun et al. |
| 2017/0229917 | A1 | 8/2017 | Kurs et al. |
| 2017/0256991 | A1 | 9/2017 | Bronson et al. |
| 2017/0324351 | A1 | 11/2017 | Rochford |
| 2017/0346343 | A1 | 11/2017 | Atasoy et al. |
| 2017/0346345 | A1 | 11/2017 | Kurs et al. |
| 2017/0358953 | A1 | 12/2017 | Trudeau et al. |
| 2018/0006566 | A1 | 1/2018 | Bronson et al. |
| 2018/0056800 | A1 | 3/2018 | Meichle |
| 2018/0062421 | A1 | 3/2018 | Danilovic et al. |
| 2018/0090995 | A1* | 3/2018 | Arasaki ................. H02J 50/12 |
| 2018/0236879 | A1 | 8/2018 | Elshaer et al. |
| 2018/0358844 | A1 | 12/2018 | Yu et al. |
| 2019/0006888 | A1 | 1/2019 | Hajimiri et al. |
| 2019/0115837 | A1 | 4/2019 | Fahlenkamp et al. |
| 2019/0148986 | A1 | 5/2019 | Yoo et al. |
| 2019/0165611 | A1* | 5/2019 | Miyazawa ............... H02M 7/06 |
| 2019/0326743 | A1* | 10/2019 | Govindaraj ............. H02J 50/10 |
| 2020/0161901 | A1 | 5/2020 | Tombelli |
| 2020/0303926 | A1 | 9/2020 | Yang |
| 2020/0381945 | A1 | 12/2020 | Wang et al. |
| 2021/0281099 | A1* | 9/2021 | Wan ....................... H02J 50/80 |

FOREIGN PATENT DOCUMENTS

| | | | |
|---|---|---|---|
| DE | 10 2014 208 991 A1 | 11/2014 | |
| EP | 2763279 A1 | 8/2014 | |
| EP | 3145047 A1 | 3/2017 | |
| EP | 3203634 A1 | 8/2017 | |
| EP | 3248270 A1 | 11/2017 | |
| EP | 3407467 A1 | 11/2018 | |
| EP | 3599700 A1 * | 1/2020 | ............ H02J 50/12 |
| GB | 1506633 A | 4/1978 | |
| JP | H11127580 A | 5/1999 | |
| JP | 5635215 B1 | 12/2014 | |
| KR | 20170118573 A | 10/2017 | |
| WO | WO-2001018936 A1 | 3/2001 | |
| WO | WO-2013036947 A2 | 3/2013 | |
| WO | WO-2015119511 A1 | 8/2015 | |
| WO | WO-2016099806 A1 | 6/2016 | |
| WO | WO-2017070009 A1 | 4/2017 | |
| WO | WO-2018136885 A1 | 7/2018 | |

OTHER PUBLICATIONS

U.S. Appl. No. 15/602,775 U.S. Pat. No. 10,804,742 Published as: US2017/0346343 A1, Voltage Regulation in Wireless Power Receivers, filed May 23, 2017.

U.S. Appl. No. 17/039,266 Published as: US2021/0028652, Voltage Regulation in Wireless Power Receivers, filed Sep. 30, 2020.

U.S. Appl. No. 15/685,889 U.S. Pat. No. 10,418,841 Published as: US2018/0062421, Wireless Power Systems Having Interleaved Rectifiers, filed Aug. 24, 2017.

U.S. Appl. No. 16/543,090 U.S. Pat. No. 10,707,693 Published as: US2020/0044477, Wireless Power Systems Having Interleaved Rectifiers, filed Aug. 16, 2019.

U.S. Appl. No. 17/003,800 Published as: US2021/0066968, Control of Active Rectification in Wireless Power Systems, filed Aug. 26, 2020.

U.S. Appl. No. 17/194,089 Published as: US2021-0281112, Active Rectification in Wireless Power Systems, filed Mar. 5, 2021.

U.S. Appl. No. 17/194,082 Published as: US2021/0297004, Active Rectification in Wireless Power Systems, filed Mar. 5, 2021.

International Search Report—International Application No. PCT/US2017/048481, dated Dec. 6, 2017, together with the Written Opinion of the International Searching Authority, 11 pages.

(56) References Cited

OTHER PUBLICATIONS

International Search Report—International Application No. PCT/US2021/021209, dated Aug. 17, 2021, together with the Written Opinion of the International Searching Authority, 17 pages.
International Search Report and Written Opinion for PCT/US2019/063616 dated Mar. 11, 2020, 9 pages.
International Search Report and Written Opinion for PCT/US2019/059441 dated Feb. 18, 2020, 11 pages.
International Search Report and Written Opinion for PCT/US2020/034344 dated Oct. 28, 2020, 15 pages.
International Search Report and Written Opinion for PCT/US2020/048046 dated Oct. 8, 2020, 10 pages.
International Search Report—International Application No. PCT/US2017/054055 dated Dec. 21, 2017, together with the Written Opinion of the International Searching Authority, 12 pages.
The International Search Report and the Written Opinion of the International Searching Authority, PCT/US2017/033997, 9 pages, dated Sep. 12, 2017.
Rivas, et al., Design Considerations for Very High Frequency dc-dc Converters, 37th IEEE Power Electronics Specialists Conference, Jun. 18-22, 2006, 11 pages, Jeju, Korea.
Rivas, et al., New Architectures for Radio-Frequency dc/dc Power Conversion, 2004 35th Annual IEEE Power Electronics Specialists Conference, 2004, 11 pages, Aachen, Germany.

\* cited by examiner

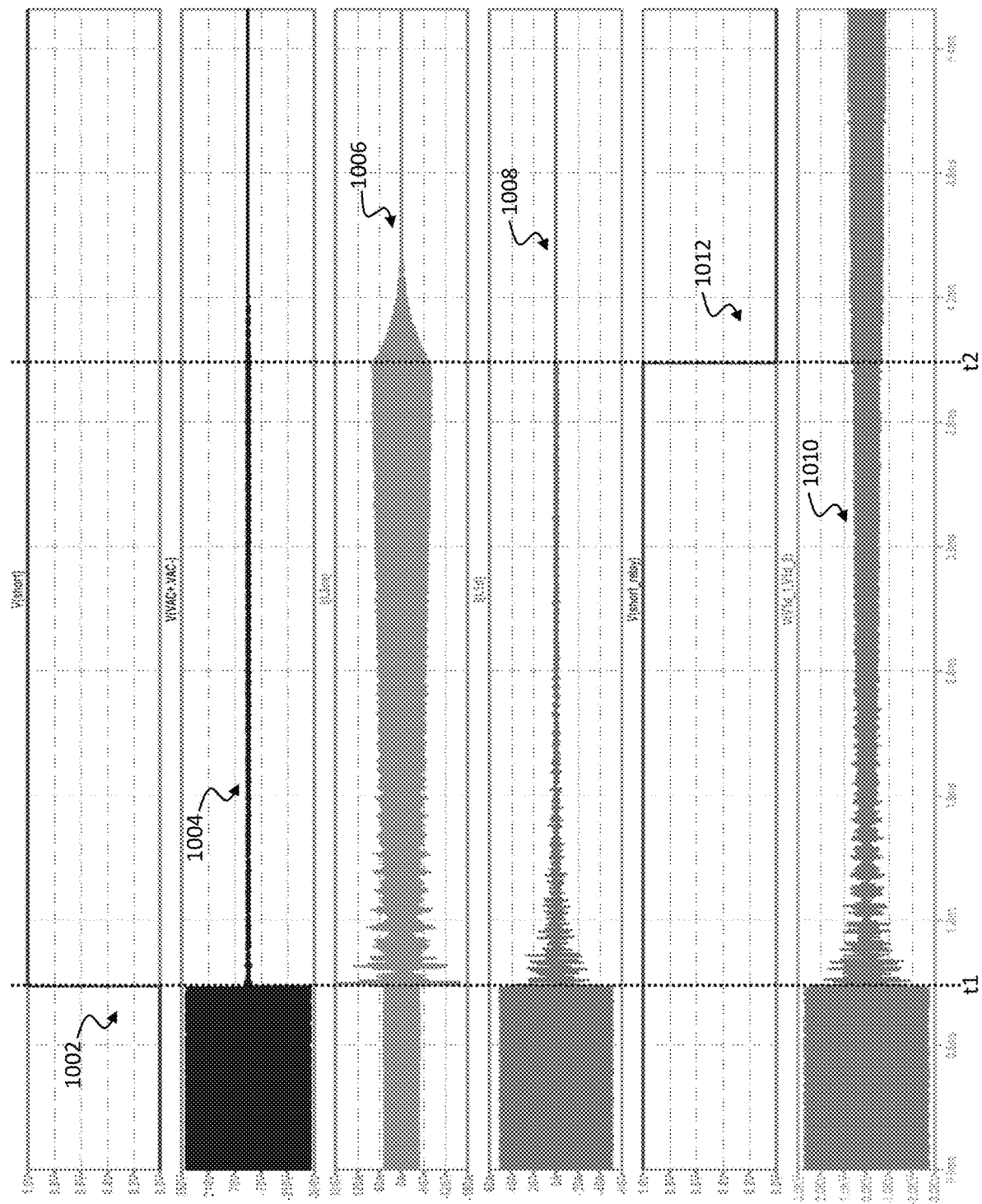

PROTECTION CIRCUITS FOR WIRELESS POWER RECEIVERS

CROSS-REFERENCE TO RELATED APPLICATIONS

This application claims priority to and the benefit of U.S. Provisional Patent Application No. 62/852,666 titled "Battery Interface Circuits for Wireless Power Systems" and filed on May 24, 2019, the entirety of which is incorporated herein by reference.

TECHNICAL FIELD

The following disclosure is directed to protection circuits for wireless power systems and, more specifically, protection circuits for wireless power receivers including a battery disconnect circuit, a load dump protection circuit, and/or coil disconnect circuit.

BACKGROUND

Wireless power systems are configured to transmit power to a load (e.g., a battery of an electrical device) without mechanical contact between the transmitter and receiver. In some situations, wireless power systems can be susceptible to one or more failure modes. For example, the behavior of the load may be outside the control of the wireless power system and may thus cause undesirable conditions in the components of the wireless power system. In other situations, the wireless power receiver need to protect its components from a malfunctioning wireless power transmitter or mechanical damage.

SUMMARY

In one aspect, the disclosure features methods for protecting a wireless power receiver. The wireless power receiver can include a resonator coil coupled to an impedance circuit and a rectifier including at least one transistor. The impedance circuit can include (i) a first set of capacitors coupled in series with the resonator coil; (ii) a second set of capacitors coupled in parallel with the resonator coil; and (iii) at least one inductor coupled between the second set of capacitors and an input of the rectifier. The exemplary protection method can include turning on the at least one transistor such that a coil current in the resonator coil is reduced to zero or near zero Amperes; and opening, after a period of time, at least one relay coupled to or within the impedance circuit such that the coil current and an input current to the rectifier are reduced to zero or near zero Amperes.

Various embodiments of the exemplary protection methods may include one or more of the following features. The period of time may be between 1 millisecond to 1 second. The at least one relay may be coupled between a first node of the resonator coil and the first set of capacitors. The at least one relay can include a second relay, in which the second relay is coupled to a second node of the resonator coil and in which the second node is opposite the first node. The first set of capacitors may include a first subset of capacitors coupled to a first node of the resonator coil and a second subset of capacitors coupled in series with the first subset, and the at least one relay may be coupled between the first subset and the second subset. The first set of capacitors may include a third subset of capacitors coupled to a second node of the resonator coil and a fourth subset of capacitors coupled in series with the third subset, in which the second node is opposite the first node, and the at least one relay may include a second relay coupled between the third subset and the fourth subset.

The at least one relay may be coupled between the first set of capacitors and the second set of capacitors. The at least one relay may be coupled to a first node of the second set of capacitors, and the at least one relay may include a second relay coupled between the first set of capacitors and a second node of the capacitors, in which the second node is opposite the first node. The at least one relay may be coupled between the second set of capacitors and the at least one inductor. The at least one relay may be coupled to a first node of the second set of capacitors. The at least one inductor may include a second inductor coupled between a second node of the second set of capacitors and the input of the rectifier, in which the second node opposite the first node, and wherein the at least one relay comprises a second relay coupled between the second node and the second inductor. The first set of capacitors may have a first capacitive reactance; the second set of capacitors may have a second capacitive reactance; and the at least one inductor may have an inductive reactance. The absolute value of the first capacitive reactance may be equal to each of (i) an absolute value of the second capacitive reactance and (ii) an absolute value of the inductive reactance. The turning on of the at least one transistor may cause an input current to the rectifier to increase. The at least one transistor may be a low-side transistor having a node coupled to a negative node of a battery coupled to an output of the rectifier. The turning on of the at least one transistor may include turning on of two transistors. The two transistors may be low-side transistors, in which each has a node coupled to a negative node of a battery coupled to an output of the rectifier.

In another aspect, the disclosure features protection circuits for wireless power receivers. The receiver can include a resonator coil coupled an impedance circuit. The impedance circuit can be coupled to a rectifier, and the impedance circuit can include (i) a first set of capacitors coupled in series with the resonator coil; (ii) a second set of capacitors coupled in parallel with the resonator coil; and (iii) at least one inductor coupled between the second set of capacitors and an input of the rectifier. The protection circuits can include, when the receiver is energized, at least one transistor configured to turn on such that a coil current in the resonator coil is reduced to zero or near zero Amperes, and at least one relay coupled to or within the impedance circuit, in which the relay is configured to such that the coil current and the input current are reduced to zero or near zero Amperes.

Various embodiments of the exemplary protection circuits can include one or more of the following features. The period of time may be between 1 millisecond to 1 second. The at least one relay may be coupled between a first node of the resonator coil and the first set of capacitors. The at least one relay may be coupled between the first set of capacitors and the second set of capacitors. The at least one relay may be coupled between the second set of capacitors and the at least one inductor. The at least one relay may be coupled to a first node of the second set of capacitors. The at least one inductor may include a second inductor coupled between a second node of the second set of capacitors and the input of the rectifier, in which the second node opposite the first node, and wherein the at least one relay comprises a second relay coupled between the second node and the second inductor. The first set of capacitors may have a first capacitive reactance; the second set of capacitors may have a second capacitive reactance; and the at least one inductor may have an inductive reactance. The absolute value of the first capacitive reactance may be equal to each of (i) an absolute value of the second capacitive reactance and (ii) an absolute value of the inductive reactance. The turning on of the at least one transistor may cause an input current to the rectifier to increase. The at least one transistor may be a low-side transistor having a node coupled to a negative node of a battery coupled to an output of the rectifier. The turning on of the at least one transistor may include turning on of two transistors. The two transistors may be low-side transistors, in which each has a node coupled to a negative node of a battery coupled to an output of the rectifier.

In another aspect, the disclosure features wireless power receivers that include a resonator coil configured to inductively receive power and a rectifier coupled to the impedance circuit, in which the rectifier includes at least one low-side transistor. The receivers can include an impedance circuit coupled between the resonator coil and the rectifier. The impedance circuit can include (i) a first set of capacitors coupled in series with the resonator coil; (ii) a second set of capacitors coupled in parallel with the resonator coil; and (iii) at least one inductor coupled between the second set of capacitors and an input of the rectifier. The receivers can include at least one relay coupled to or within the impedance circuit. When the receiver is energized, the at least one transistor is configured to be turned on such that the coil current in the resonator coil is reduced to zero or near zero Amperes, and the at least one relay is configured to open, after a period of time after the transistor is turned on, such that the coil current and an input current to the rectifier are reduced to zero or near zero Amperes.

Various embodiments of the wireless power receivers can include one or more of the following features. The period of time may be between 1 millisecond to 1 second. The at least one relay may be coupled between a first node of the resonator coil and the first set of capacitors. The at least one relay may be coupled between the first set of capacitors and the second set of capacitors. The at least one relay may be coupled between the second set of capacitors and the at least one inductor. The at least one relay may be coupled to a first node of the second set of capacitors. The at least one inductor may include a second inductor coupled between a second node of the second set of capacitors and the input of the rectifier, in which the second node opposite the first node, and wherein the at least one relay comprises a second relay coupled between the second node and the second inductor. The first set of capacitors may have a first capacitive reactance; the second set of capacitors may have a second capacitive reactance; and the at least one inductor may have an inductive reactance. The absolute value of the first capacitive reactance may be equal to each of (i) an absolute value of the second capacitive reactance and (ii) an absolute value of the inductive reactance. The turning on of the at least one transistor may cause an input current to the rectifier to increase. The at least one transistor may be a low-side transistor having a node coupled to a negative node of a battery coupled to an output of the rectifier. The turning on of the at least one transistor may include turning on of two transistors. The two transistors may be low-side transistors, in which each has a node coupled to a negative node of a battery coupled to an output of the rectifier.

In another aspect, the disclosure features methods for disconnecting a battery from a wireless power receiver. The receiver can include (i) a rectifier coupled in parallel to an output capacitor, in which the capacitor is coupled between a first node and a second node at an output of the rectifier, and (ii) a first switch coupled to the input of the rectifier. The receiver can be coupled to a transistor coupled between the second node and a negative node of the battery, in which the transistor is configured to reduce a current level when turned off. The receiver can be coupled to a disconnect circuit including a second switch coupled between the first node and a positive node of the battery. The methods can include the steps of (a) turning off the transistor during a time when the receiver is energized such that voltage increases in the output capacitor; (b) closing the first switch such that the voltage at the output capacitor is at constant voltage or near-constant voltage; and (c) opening the second switch such that the battery is disconnected from the receiver.

Various embodiments of the exemplary methods can include one or more of the following features. The disconnect circuit may include a subcircuit comprising a resistor coupled in series to a third switch, in which the subcircuit is coupled in parallel to the second switch. The methods may include (d) opening the third switch, in which step (d) is during or after step (c). The disconnect circuit may include a fourth switch coupled between the transistor and the negative node of the battery. The methods may include (d) opening the fourth switch, in which step (d) is during or after step (c). Step (b) may be executed after step (a) and step (c) may be executed after step (b). Before step (a), the second switch may be closed, the transistor may be on, and the first switch may be open. The output capacitor may be coupled to a resistor and, in step (b), the resistor may enable the voltage at the output capacitor to decrease. The transistor may be coupled to a controller that is configured to turn off the transistor. The second switch may be controlled by a battery management system. The battery management system may be communicably coupled to a controller associated with the receiver. The transistor may be a metal-oxide semiconductor field-effect transistor (MOSFET) and the first and second switches may be relays.

In another aspect, the disclosure features protection circuits for a wireless power receiver. The receiver can include a rectifier coupled in parallel to an output capacitor, in which the capacitor is coupled between a first node and a second node at an output of the rectifier. The protection circuits can include a transistor coupled between the second node and a negative node of the battery. The transistor can be configured to reduce a current level when turned off. The protection circuits can include a first switch coupled across the input of the rectifier, and a disconnect circuit comprising a second switch coupled between the first node and a positive node of the battery. In step (a), the transistor can be turned off during a time when the receiver is energized such that voltage increases in the output capacitor. In step (b) the first switch can be closed such that the voltage at the output capacitor is at constant voltage or near-constant voltage. In step (c) the second switch can open such that the battery is disconnected from the receiver.

Various embodiments of the exemplary protection circuits can include one or more of the following features. The disconnect circuit may include a subcircuit including a resistor coupled in series to a third switch, in which the subcircuit is coupled in parallel to the second switch. In step (d), the third switch may open, in which step (d) is during or after step (c). The disconnect circuit may include a fourth switch coupled between the transistor and the negative node of the battery. In step (d), the fourth switch may open, in which step (d) is during or after step (c). Step (b) may be executed after step (a) and step (c) may be executed after step (b). Before step (a), the second switch may be closed, the transistor may be on, and the first switch may be open.

The output capacitor may be coupled to a resistor and wherein, in step (b), the resistor enables the voltage at the output capacitor to decrease. The transistor may be coupled to a controller that is configured to turn off the transistor. The second switch may be controlled by a battery management system. The battery management system may be communicably coupled to a controller associated with the receiver. The transistor may be a metal-oxide semiconductor field-effect transistor (MOSFET) and the first and second switches may be relays.

In another aspect, the disclosure features systems and methods for disconnecting a battery from a wireless power receiver. The receiver can include (i) a rectifier coupled in parallel to an output capacitor, the capacitor being coupled between a first node and a second node at an output of the rectifier, and (ii) a first switch coupled to the input of the rectifier. The receiver can be coupled to a disconnect circuit including a second switch in series with a transistor coupled between the first node and a positive node of the battery. The transistor can be configured to cut current to zero Amperes when turned off. The method can include the steps of: (a) when the receiver is energized, turning off the transistor such that voltage increases in the output capacitor; (b) closing the first switch such that the voltage at the output capacitor is at constant voltage or near-constant voltage; and (c) opening the second switch such that the battery is disconnected from the receiver.

Various embodiments of the systems and methods can include one or more of the following features. Step (b) can be executed after step (a) and step (c) can be executed after step (b). The transistor can be a low-voltage MOSFET rated for a maximum of 40 V. The receiver can include a third switch coupled between the second node and a negative node of the battery. The method can further include opening the third switch such that the battery is disconnected from the receiver.

The disconnect circuit can further include a branch coupled in parallel to the second switch in series with the transistor. The branch can include a diode coupled in series with a second transistor. The method can further include (d) turning on the second transistor such that current from the rectifier is diverted from the transistor to the second transistor. Step (d) can be executed after step (a) and before step (b). The method can further include (e) turning off the second transistor. Step (e) can be executed after step (c).

In another aspect, the disclosure features systems and methods for disconnecting a battery from a wireless power receiver. The receiver can include (i) a rectifier coupled in parallel to a first transistor between a first node and a second node at an output of the rectifier, (ii) a second transistor in series with an output capacitor coupled between the first node and the second node. The receiver can be coupled to a disconnect circuit including (a) a first switch in series with a third transistor coupled between the first node and a positive node of the battery, and (b) a diode and fourth transistor coupled in parallel to the third transistor. The first, second, third, and fourth transistors can be configured to cut current to zero Amperes when turned off. The method can include the steps of: (a) when the receiver is energized, turning on the fourth transistor such that current from the rectifier flows through the fourth transistor; (b) turning off the third transistor; (c) opening the first switch and turning off the fourth transistor and the second transistor such that the battery is disconnected; and (d) turning on the first transistor to prevent an over-voltage condition at the output capacitor, the over-voltage condition being a voltage at the output capacitor greater than a maximum voltage rating for the capacitor.

Various embodiments of the systems and methods can include one or more of the following features. Step (b) can be executed after step (a) and step (c) can be executed after step (b). The disconnect circuit can further include a second switch coupled between the second node and a negative node of the battery. The method can further include the step of (e) opening the second switch such that the battery is disconnected. Step (e) can be executed after step (d).

In another aspect, the disclosure features systems and methods for disconnecting a battery from a wireless power receiver. The receiver can include (i) a rectifier coupled in parallel to an output capacitor. The capacitor can be coupled between a first node and a second node at an output of the rectifier, and (ii) a first switch coupled to the input of the rectifier. The receiver can be coupled to a transistor coupled between the second node and a negative node of the battery. The transistor can be configured to cut current to zero Amperes when turned off. The receiver can be coupled to a disconnect circuit including a second switch coupled between the first node and a positive node of the battery, and a subcircuit including a resistor coupled in series to a third switch. The subcircuit can be coupled in parallel to the second switch. The method can include the steps of: (a) when the receiver is energized, turning off the transistor such that voltage increases in the output capacitor; (b) closing the first switch such that the voltage at the output capacitor is at constant voltage or near-constant voltage; and (c) opening the second switch such that the battery is disconnected from the receiver.

BRIEF DESCRIPTION OF THE DRAWINGS

FIGS. 10A-10F are plots illustrating various signals in the receiver of FIG. 9A or 9B during the use of an exemplary coil disconnect circuit.

DETAILED DESCRIPTION

Various embodiments of wireless power receivers may have circuits configured to provide protection from various conditions, such as overvoltage, overcurrent, over-temperature, sudden changes to power, erroneous power transmission, and/or mechanical damage that may cause harm to the system. Details of illustrative embodiments are discussed below.

Wireless Power Systems

Figure 1:
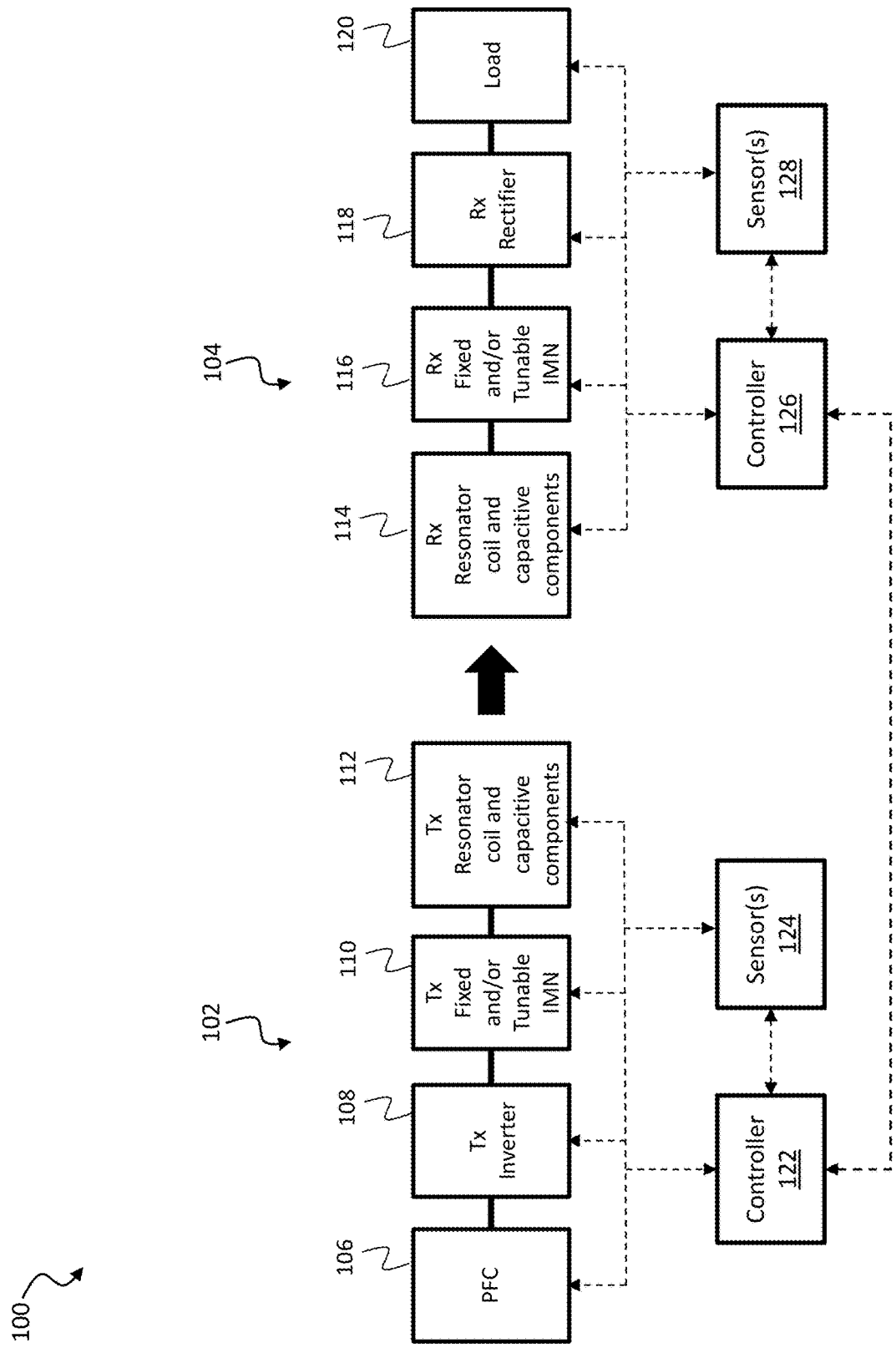
FIG. 1 is a block diagram of an exemplary wireless power system.

FIG. 1 is a block diagram of an exemplary wireless power system 100. The system 100 includes a wireless power transmitter 102 and a wireless power receiver 104. In transmitter 104, a power source (e.g., AC mains, battery, etc.) provides power to an inverter 108. Additional components can include power factor correction (PFC) circuit 106 before the inverter stage 108. The inverter 108 drives the transmitter resonator coil and capacitive components 112 ("resonator"), via an impedance matching network 110 (having fixed and/or tunable network components). The transmitter resonator 112 produces an oscillating magnetic field which induces a voltage and/or current in receiver resonator 114. The received energy is provided to a rectifier 118 via impedance matching network 116 (having fixed and/or tunable network components). Ultimately, the rectified power is provided to a load 120 (e.g., one or more batteries of an electric or hybrid vehicle). In some embodiments, the battery voltage level can impact various parameters (e.g., impedance) of the wireless power system 100. Therefore, the battery voltage level may be received, determined, or measured to be provided as input to other portions of the wireless power system 100. For example, typical battery voltage ranges for electric vehicles include 200-280 V, 200-350 V, 200-420 V, etc.

In some embodiments, one or more components of the transmitter 102 can be coupled to a controller 122, which may include a communication module (e.g., Wi-Fi, radio, Bluetooth, in-band signaling mechanism, etc.) configured to communicate with a communication module of receiver 104. In some embodiments, one or more components of the transmitter 102 can be coupled to one or more sensors 124 (e.g., a current sensor, a voltage sensor, a power sensor, a temperature sensor, a fault sensor, etc.). The controller 122 and sensor(s) 124 can be operably coupled to control portions of the transmitter 102 based on feedback signals from the sensor(s) 124 and/or sensor(s) 128.

In some embodiments, one or more components of the receiver 104 can be coupled to a controller 126, which may include a communication module (e.g., WiFi, radio, Bluetooth, in-band signaling mechanism, etc.) configured to communicate with a communication module of transmitter 102. In some embodiments, one or more components of the transmitter 104 can be coupled to one or more sensors 128 (e.g., a current sensor, a voltage sensor, a power sensor, a temperature sensor, a fault sensor, etc.). The controller 126 and sensor(s) 128 can be operably coupled to control portions of the transmitter 102 based on feedback signals from the sensor(s) 128 and/or sensor(s) 124.

Examples of wireless power systems can be found in U.S. Patent Application Publication No. 2010/0141042, published Jun. 10, 2010 and titled "Wireless energy transfer systems," and U.S. Patent Application Publication No. 2012/0112535, published May 10, 2012 and titled "Wireless energy transfer for vehicles," both of which are hereby incorporated by reference in their entireties.

The exemplary systems and methods disclosed herein may be described with respect to a vehicle application but can also be applied to any system or apparatus powered by electricity, e.g., robots, industrial machines, appliances, consumer electronics, etc. High-power wireless power transmitters can be configured to transmit wireless power in applications such as powering of and/or charging a battery of vehicles, industrial machines, robots, or electronic devices relying on high power. For the purpose of illustration, the following disclosure focuses on wireless power transmission for vehicles. However, it is understood that any one or more of the embodiments described herein can be applied to other applications in which wireless power can be utilized.

As used herein, the term "capacitor", or the symbol therefor, can refer to one or more electrical components having a capacitance (e.g., in Farads) and/or capacitive reactance (e.g., in Ohms). For example, a capacitor may refer to one or more capacitors (e.g., in a "bank" of capacitors) that may be on the order of tens, hundreds, etc. of discrete capacitors. Two or more capacitors may be coupled in series or parallel to attain the desired capacitance and/or desired capacitive reactance. Note that capacitive reactance may be expressed as a negative value herein. However, one skilled in the art would recognize that, in some conventions, capacitive reactance may also be expressed as a positive value.

As used herein, the term "inductor", or the symbol therefor, can refer to one or more electrical components having a inductance (e.g., in Henries) and/or inductive reactance (e.g., in Ohms). For example, an inductor may refer to one or more discrete inductors or coils. Two or more inductors may be coupled in series or parallel to attain a desired inductance and/or desired inductive reactance. Note that inductive reactance may be expressed as a positive value herein.

While the disclosure, including the Figures, may provide exemplary values for the various electrical components, it is understood that the value of the components can be customized for the particular application. For example, the value of various electronic components can depend whether the wireless power transmitter is used to transmit power for charging a vehicle battery (on the order of thousands of Watts) or a cell phone battery (typically less than 5 Watts).

Exemplary Protection Circuitry for Wireless Power Receivers

In some embodiments, protection circuitry for wireless power systems includes a battery disconnect circuit, a load dump protection circuit, and/or a coil disconnect circuit. One or more of these protection circuits may be employed by a wireless power receiver 104, as discussed in further detail herein. Further, one or more of these protection circuits can enable a wireless power receiver 104 to be able to protect itself independently from a wireless power transmitter 102.

Exemplary battery disconnect circuits can be configured to disconnect a battery 120 (e.g., a battery of a vehicle) from the wireless power receiver 104. In some embodiments, a battery disconnect circuit can include relays, switches, contactors, or other mechanisms to disconnect the battery 120 from the receiver 104. In an exemplary embodiment, relays can be configured to shut down the current through the battery quickly. For example, relays can turn off (open) at zero (0) current within 50 milliseconds.

Exemplary load dump protection circuits can be configured to protect the wireless power receiver 102 from some or all harmful effects of disconnecting the load from the receiver 104. In some embodiments, a load dump protection circuit can include relays, switches, or other mechanisms to protect the wireless power receiver 104. For example, assuming the rectifier is a diode rectifier, the load dump protection circuit can short the rectifier 118 of the receiver 104. If the rectifier 118 is a switching rectifier (e.g., active rectifier), then the low-side switches of the rectifier 118 can be shorted, acting as a load dump protection circuit. In some embodiments, the battery disconnect circuit interacts with the load dump protection circuit to provide protection. In other embodiments, the battery disconnect circuit and the load dump protection circuit can operate independently to provide protection. As described in some examples below, interaction between the battery disconnect circuit and the load dump protection circuit is an important consideration. Specifically, the timing and order of operation of the components of the battery disconnect circuit and the load dump protection circuit is important in preventing over-voltage and/or over-current conditions in any portions of the receiver (e.g., damage to low-voltage components).

Exemplary coil disconnect circuits can be configured to protect the wireless power receiver 104 in one or more situations. For instance, as described above, an exemplary receiver 104 may include a load dump protection circuit either in addition to a rectifier or integrated as the low-side switches of a switching or active rectifier. In this case, the coil disconnect circuit can be utilized to protect the switches (e.g., transistors) of the load dump protection circuit.

For instance, a coil disconnect circuit can be used to protect the receiver 104 against strong and/or rogue currents induced by the transmitter 102. Such currents could harm switches in the load dump protection circuitry. In some cases, a coil disconnect circuit may be used to safely turn off the receiver 104 independent of whether the transmitter 102 is transmitting power to the receiver 104. This situation may arise if the transmitter 102 and the receiver 104 are manufactured by two separate entities, such that a receiver 104 made by one entity needs to interoperate with a transmitter 102 made by another to successfully and safely receive power. For example, Company A may configure the transmitter 102 to interoperate with receiver 104 made by Company B; however, despite best efforts, transmitter 102 may not be completely interoperable for all use cases or operation with receiver 104. An example of this is error or break-down in communication between transmitter 102 and receiver 104. Therefore, the coil disconnect circuit may be used in certain circumstances that necessitate a safety mode for the receiver 104 without coordination with the transmitter 102.

In some cases, a coil disconnect circuit may be used to increase human safety in a situation where the transmitter 102 is transmitting power without coordination with the receiver 104. For example, if the receiver 104 is configured to stop receiving power and the transmitter 102 continues to transmit power, the energy generated by the transmitter 102 may damage parts of the receiver, including isolation from the vehicle, and potentially introduce danger to a human touching the vehicle. Therefore, a coil disconnect circuit may be used to create isolation between any potential energy in the receiver coil and the vehicle. In some cases, a coil disconnect circuit may be used to increase safety and reduce potential damage during a vehicle accident or other mishap. For example, the receiver 104 coil can be mounted to the underside of a vehicle for convenient charging purposes (e.g., for positioning the receiver 104 coil over a transmitter 102 coil). The receiver coil may have stored potential energy even when not receiving energy from a transmitter 104. In a vehicle accident, if the receiver coil is exposed to other conductive or metallic materials (e.g., by puncture, via broken packaging, etc.), an electric arc may be created, having dangerous or harmful consequences.

In some cases, a coil disconnect circuit may be used to protect a receiver 104 (and its associated vehicle or device) for a situation in which the receiver 104 is positioned near two or more transmitters 102. For example, Transmitters A and B are positioned in adjacent parking spaces for electric vehicles. An electric vehicle having Receiver A may park over Transmitter A. An electric vehicle having Receiver B may park in an adjacent parking space and erroneously communicate with Transmitter A to turn on power transmission at a particular power level. Transmitter A may begin transmitting power to Receiver A in error, thereby causing potential harm to Receiver A (and/or its associated vehicle).

As used herein, "coil disconnect circuit" may refer to a circuit for disconnecting a first portion of the receiver 104 from a second portion of the receiver 104, in which the first portion includes the receiver resonator coil. In some embodiments, a coil disconnect circuit may be configured to disconnect the receiver resonator (including at least the resonator coil and one or more capacitors) from the rest of the receiver 104.

Exemplary Protection Schemes

Figures 2A, 2B:
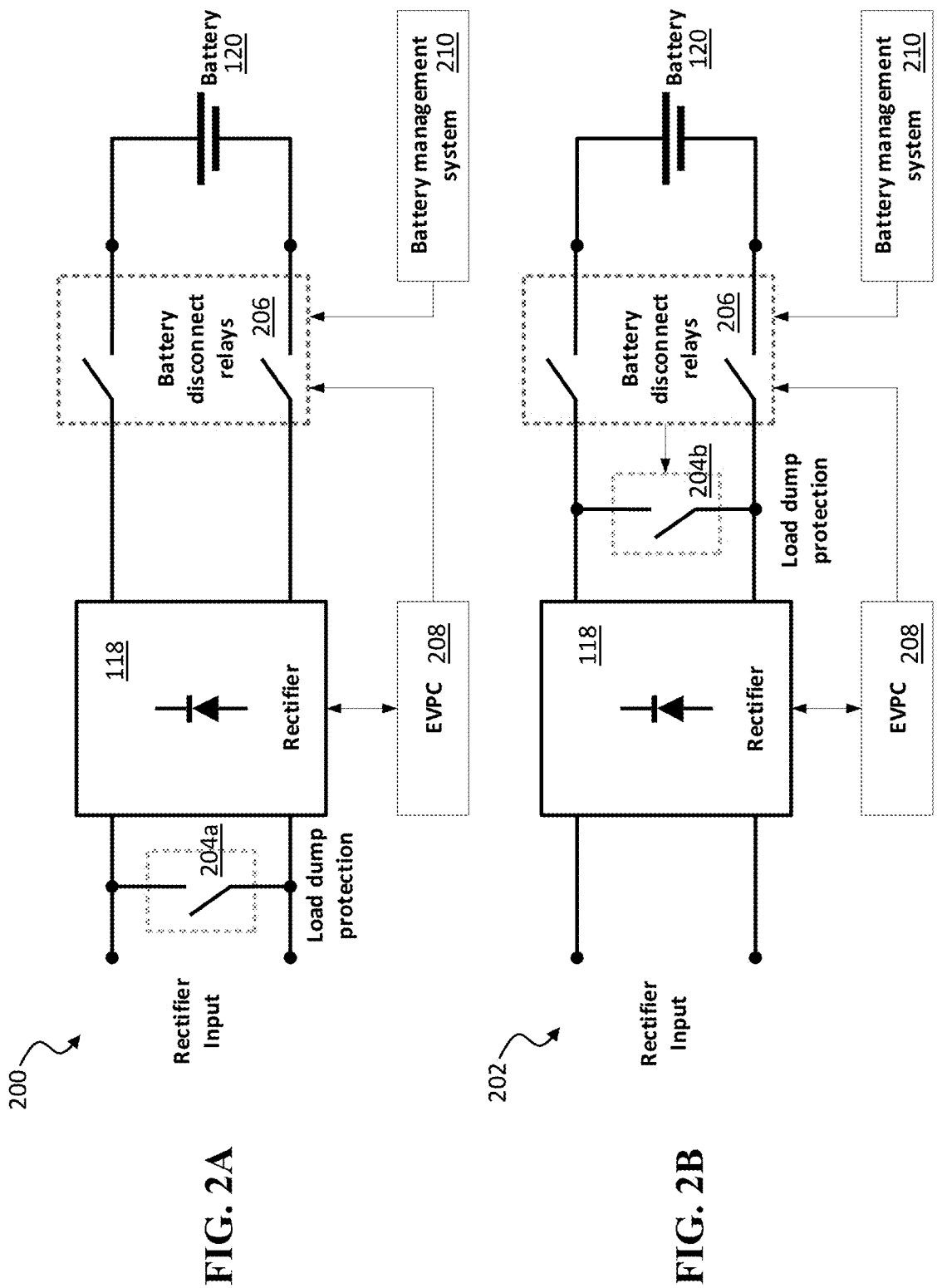
FIGS. 2A-2B are diagrams illustrating exemplary protection schemes for a wireless power receiver connected to a battery.

FIGS. 2A-2B are diagrams illustrating exemplary protection schemes 200, 202 for a wireless power receiver 104 connected to a battery 120. In the exemplary protection scheme 200 of FIG. 2A, a load dump protection circuit 204a is coupled to the input of the rectifier 118. The battery disconnect circuit 206 is coupled between the output of the rectifier 118 and the battery 120. In some embodiments. by implementing the load dump protection circuit 204a at the input of the rectifier 118 and away from the battery 120, the interface between the battery 120 and the wireless power receiver 104 is made more dependable. Specifically, by making the operation of the load dump protection circuit 204a independent from the battery disconnect circuit 206, there is a reduced chance of harm to various components (e.g., output capacitor) due to poorly executed timing of engaging circuit 204a and/or 206 (see timing of steps described in the below examples).

In the exemplary protection scheme 202 of FIG. 2B, a load dump protection circuit 204b is coupled to the output of the rectifier 118 and the battery disconnect circuit 206 is coupled between the load dump protection circuit 204b and the battery 120. One advantage to implementing the load dump protection circuit 204b at the output of the rectifier 118 is that potentially lower cost components can be used. Specifically, components configured for DC or constant voltage can be used in circuit 204b (after the rectifier 118) as compared to those configured for AC or oscillating voltage in circuit 204a (before the rectifier 118).

In some embodiments, in schemes 200 and 202, an electric vehicle power controller (EVPC) 208 can be coupled to the rectifier 118 and battery disconnect circuit 206. The EVPC 208 may be coupled to the rectifier 118, e.g., to control the operation of an active rectification, to control protection switches, and/or instrument currents, voltages and/or temperature of the rectifier 118. The EVPC 208 may be configured to turn on (close) and/or turn off (open) relays of the battery disconnect circuit 206. The EVPC 208 may be included within an enclosure of the wireless power receiver 204 and/or coupled directly to the wireless power receiver 204. In some embodiments, a battery management system (BMS) 210 can be coupled to the battery disconnect circuit 206 and can be configured to turn on (close) and/or turn off (open) relays of the battery disconnect circuit 206. The BMS 210 can be included within a battery compartment associated with the battery 120. Typically, the battery compartment is positioned in a vehicle (e.g., between the passenger compartment and the exterior of the vehicle).

In a preferred embodiment, both the EVPC 208 and the BMS 210 are enabled to turn off (open) the relays of the battery disconnect circuit 206 but only the BMS 210 can turn on (close) the relays. This may be beneficial because, in the case of an emergency shutdown, either the EVPC 208 or the BMS 210 can stop the current through the battery 120. There are also benefits to only enabling the BMS 210 to turn on (close) the relays. For example, there is a reduced conflict of control signals sent by the two controllers, EVPC 208 and BMS 210, to the relays. Specifically, it may be more harmful to the wireless power receiver 204, battery 120, and/or the vehicle if there is an inadvertent turning on of the current to the battery 210. Additionally, the BMS 210 may require sole control of power to the battery 120 so as to properly manage the various control and power inputs (e.g., from the vehicle, from another battery, from a conductive charger, etc.) to the battery 120.

Exemplary Shutdown Process

Figure 3A:
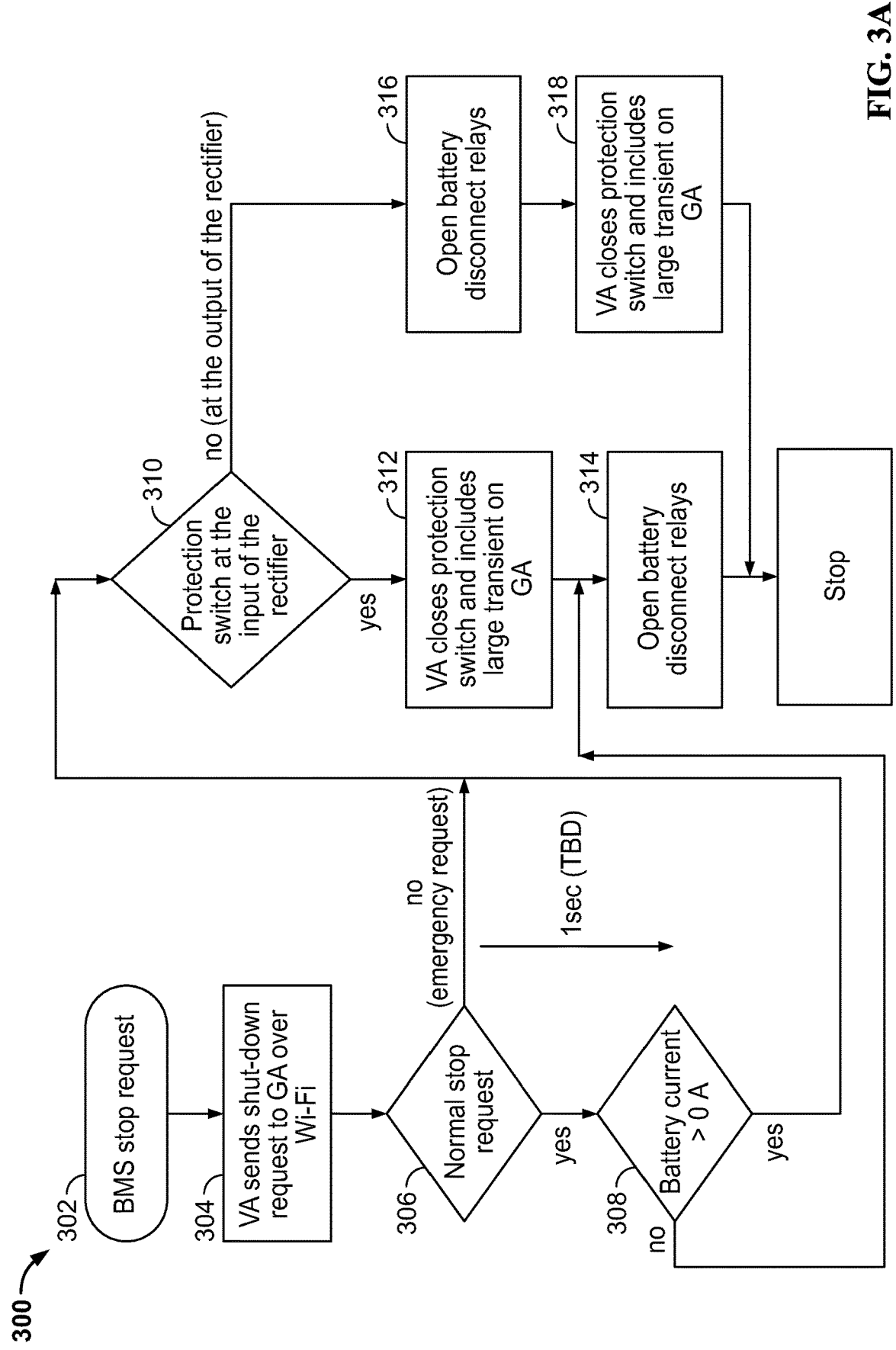
FIGS. 3A-3B are flowcharts of exemplary shutdown processes for stopping transmitted power.

FIG. 3A illustrates an exemplary shutdown process 300 in which the BMS 210 initiates a request to stop power to the battery 120 (step 302). In step 304, the wireless power receiver (or vehicle assembly (VA)) 104 sends a shutdown request to the wireless power transmitter (or ground assembly (GA)) 102 via, e.g., Wi-Fi, Bluetooth, radio, or in-band signaling. In step 306, the system determines whether this is a normal request to stop power. If determined to be a normal request, the system determines whether the current in the battery 120 is greater than zero (0) A. In some embodiments, the BMS 210 and/or the EVPC 208 can measure the current to determine whether the current is greater than zero (0) A. If, at step 306, the request is an emergency request, control passes to step 310 (as described above). In step 308, if the current is greater than zero (0) A, then control passes to step 310. If there is no current in the battery 120, then control passes to step 314.

In step 310, the system (e.g., the EVPC 208) determines whether there is a load dump protection circuit at the input or the output of rectifier 118. If there is a load dump protection circuit at the input of the rectifier 104 (e.g., circuit 204a), then in step 312, the receiver (VA) 104 closes a switch of the circuit 204a, which induces a significant power step or a large transient signal on the transmitter 102. The transmitter 102 may quickly sense this change in power or transient signal and subsequently turn off power to the receiver 104. In step 314, the EVPC 208 and/or the BMS 210 can send a signal to open relays of the battery disconnect circuit 206, which causes the current in the battery 120 to go to zero. If, in step 310, the system determines that there is a load dump protection circuit at the output of the rectifier 104 (e.g., circuit 204b), then, in step 316, the EVPC 208 and/or the BMS 210 can send a signal to open relays of the battery disconnect circuit 206, which causes the current in the battery 120 to go to zero. Then, in step 318, the receiver (VA) 104 closes a switch of the circuit 204a, which induces a significant power step or a large transient signal on the transmitter 102. The transmitter 102 may quickly sense this change in power or transient signal and subsequently turn off power to the receiver 104.

Figure 3B:
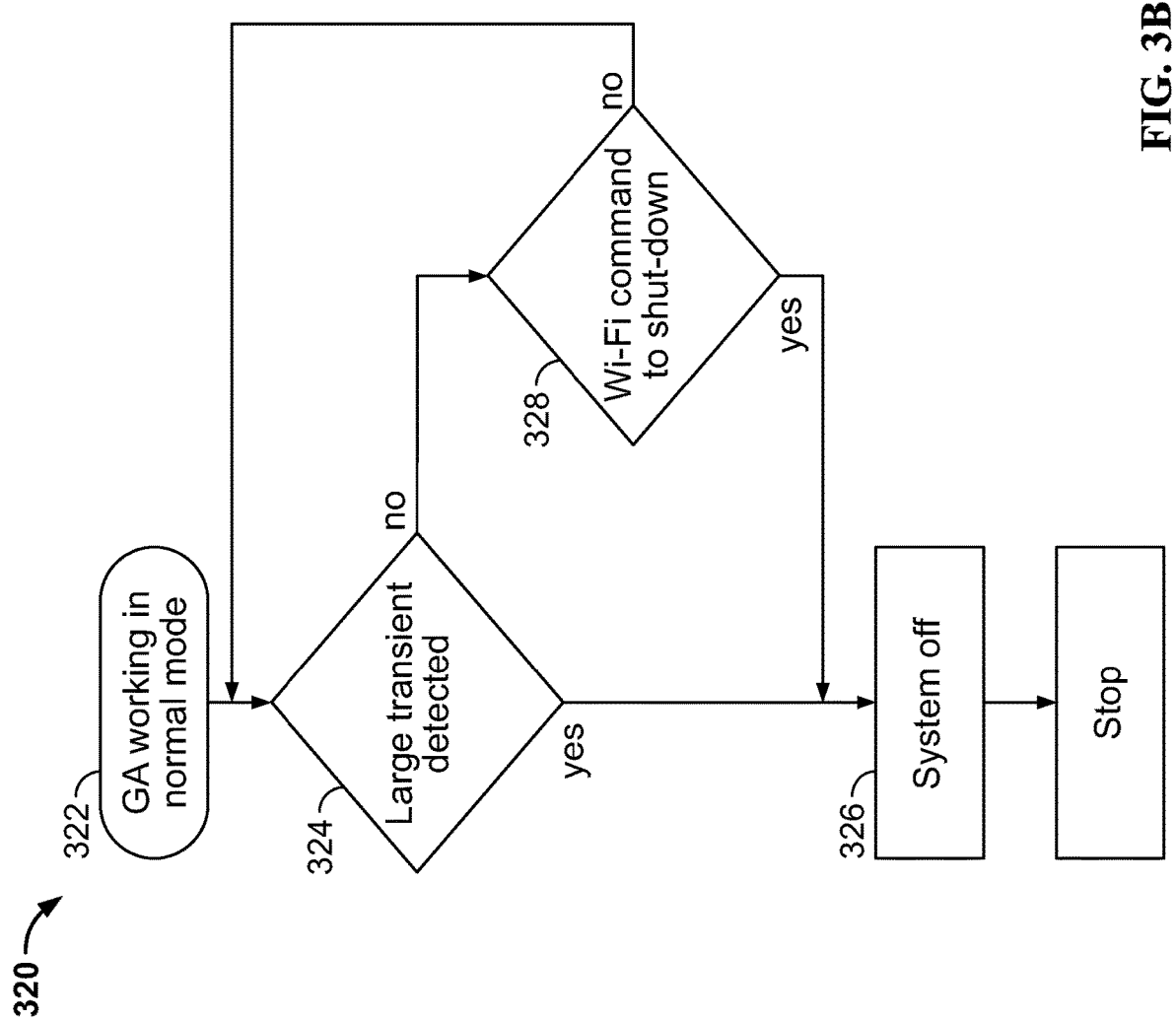

FIG. 3B illustrates an exemplary shutdown process 320 in which the transmitter (GA) 102 is operating in normal mode (step 322) and detects a large transient signal (in step 324). The transmitter (GA) 102 may include a current and/or voltage sensor 124 to detect this transient signal. The sensor 124 can then signal a controller 122 coupled to the transmitter 102 to shut down power. In step 326, the transmitter 102 is shut off. If there is no transient signal detected in step 324, then the controller 122 of the transmitter 102 determines whether a shutdown signal (e.g., over WiFi) was received. If so, the transmitter 102 is shut down. If not, control passes back to step 324.

In other embodiments, the vehicle may send a signal to a controller (e.g., EVPC 208) of the wireless power receiver 104 to shut down the current to the battery. The wireless power receiver 104 can then react by activating the load dump protection circuit 204a or 204b by, e.g., closing a switch in circuit 204a or 204b.

Exemplary Battery Interface Circuits

Figure 4:
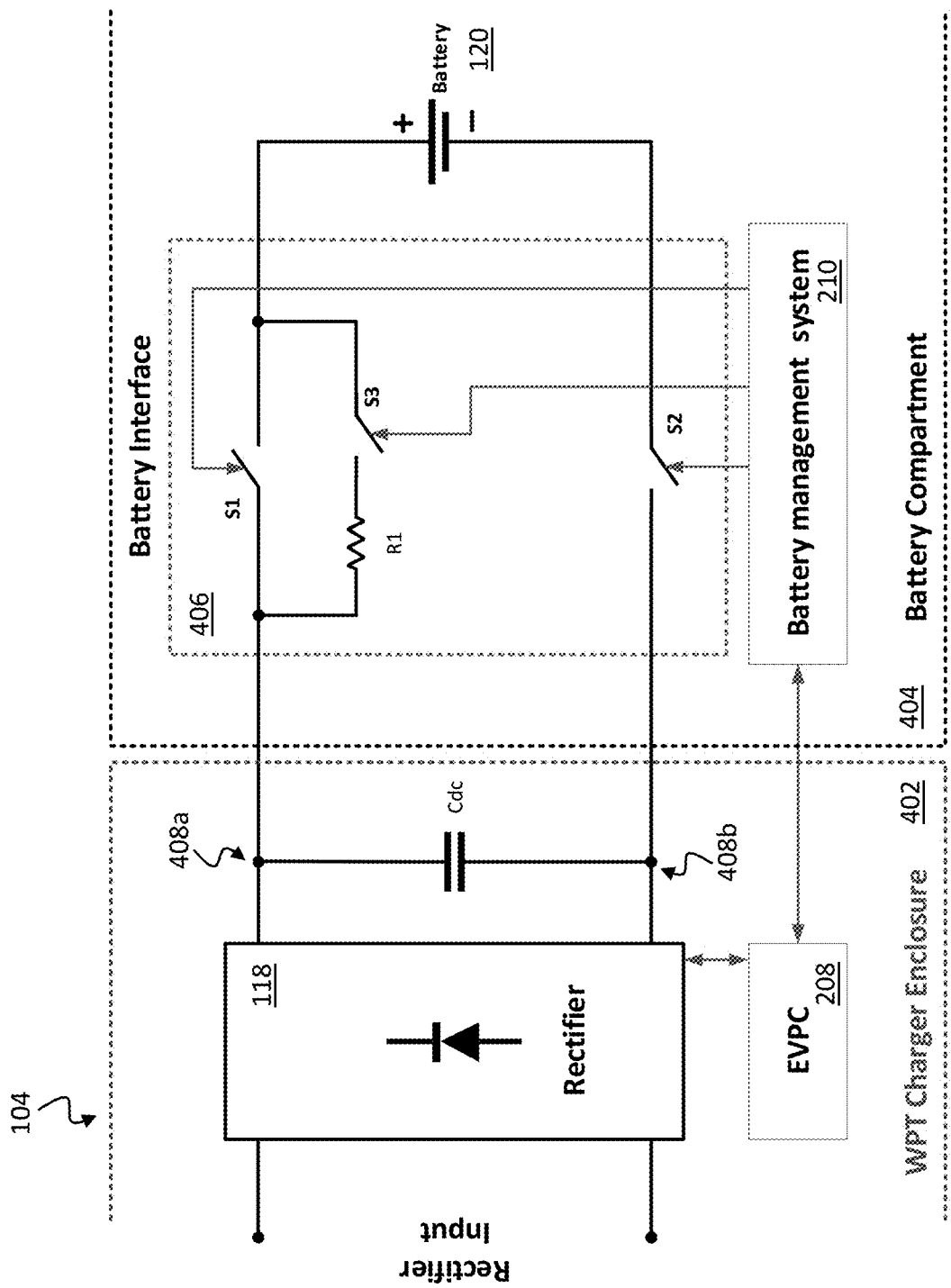
FIG. 4 is a schematic of an interface between a wireless power receiver and a battery.

FIG. 4 is a schematic of an exemplary interface between a wireless power receiver 104 and a battery 120. In some embodiments, components (e.g., 114, 116, and/or 118) of a wireless power receiver 104 may be housed together with or separately from the load 120. In this example, the wireless power receiver enclosure 402 may be separate from the battery compartment 404. For example, this may be advantageous in some vehicles in which the receiver 104 is disposed on the external underside of the vehicle while the battery 120 is positioned in another location, e.g., an internal area to the front or rear of the vehicle. In some embodiments, a battery interface circuit 406 may be include in the battery compartment 404 or in enclosure 402. In either implementation, BMS 210 controls the switches of circuit 406. In some embodiments, the battery interface circuit 406 includes the battery disconnect circuit 206. In some embodiments, in addition to the battery disconnect circuit 206, the battery interface circuit 406 includes resistor R1 and relay S3. In some embodiments, the receiver 104 and the battery 120 may be positioned some distance apart (e.g., on the order of one meter to tens of meters); therefore, the battery interface circuit 406 can include cables and terminations to accommodate the distance.

The battery interface circuit 406 may include a first switch S1 coupled between node 408a and the positive node of the battery 120. The circuit 406 may include a second switch S2 coupled between node 408b and the negative node of the battery 120. In some embodiments, switches S1 and S2 can be contactors, which are electrically controlled switches configured to be connected to high-current load devices (e.g., battery 120). The circuit 406 may include a third switch S3 (e.g., relay, transistor, contactor, etc.) coupled between node 408a and the positive node of battery 120 and in parallel with S1. The third switch S3 may be coupled in series with a resistor R1. Resistor R1 can be on the order of several kΩ (e.g., 2 kΩ to 10 kΩ) to several tens of kΩ (e.g., 20 kΩ to 100 kΩ). Switches S1, S2, and/or S3 can be coupled to the battery management system 210. In some embodiments, switches S1, S2, and/or S3 can coupled to the EVPC 208. In an exemplary embodiment, switch S2 may not be implemented in the battery interface circuit 406.

In some embodiments, when the transmitter 102 is not transmitting power, switches S1, S2, and S3 are open such that the battery 120 is disconnected from the wireless power receiver 104. Exemplary switches S1, S2, and S3, in an open state, can provide impedance on the order of tens of MS2 between the battery 120 and receiver 104. In a pre-charge phase (before charging of the battery 120 starts), switches S2 and S3 connect battery 120 to charge output capacitor CDC through resistor R1. After capacitor CDC has been charged, switch 51 closes, switch S3 opens, and battery 120 can be charged. During the charge phase, switches S1 and S2 provide a low-loss connection between the wireless power receiver 104 and the battery 120. Once charging is completed, then switches S1 and S2, disconnect the battery 120 from receiver 104.

Load Disconnect Protection at Rectifier Input

EXAMPLE 1

Figure 5A:
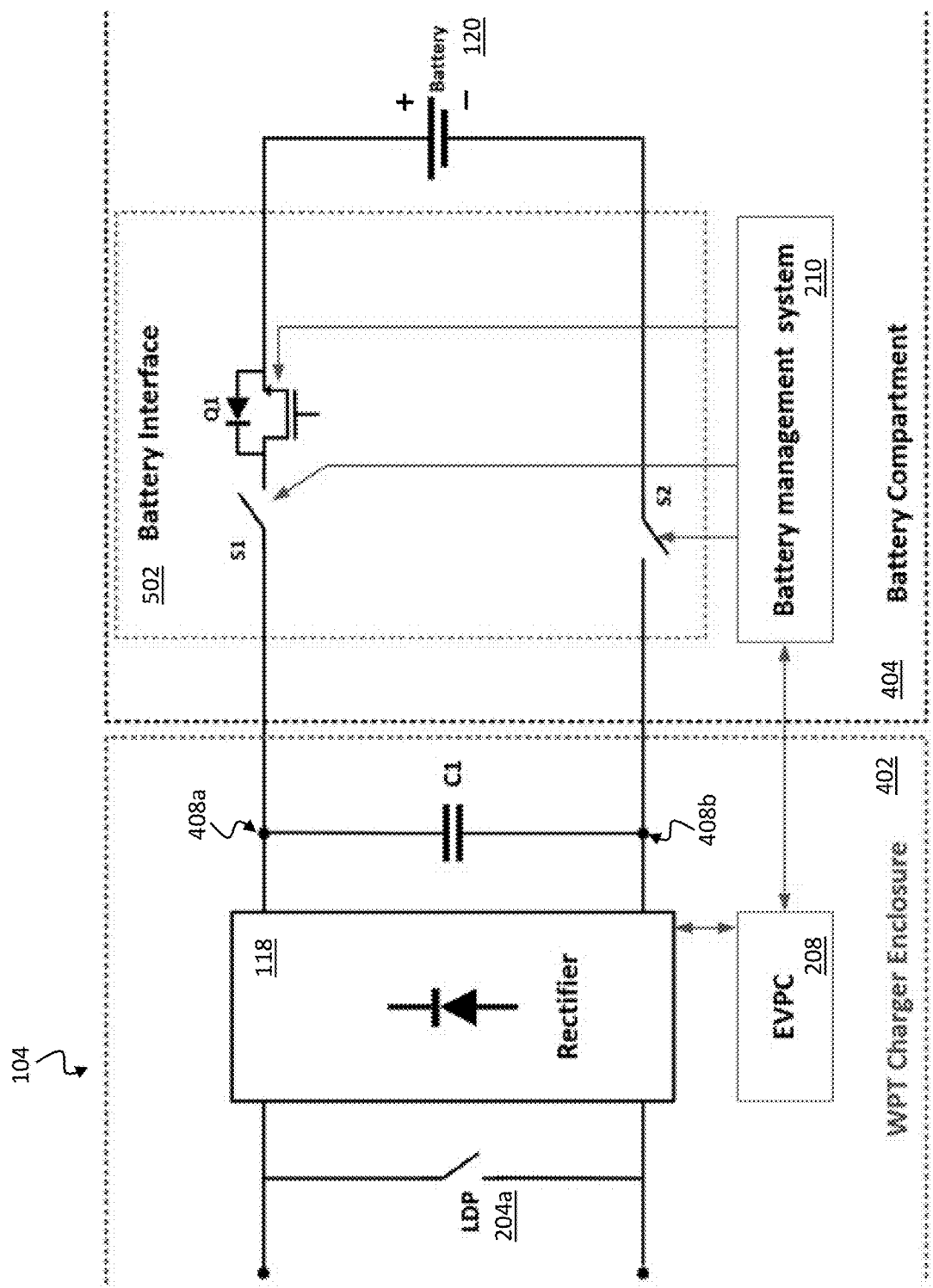
FIGS. 5A-5C is a schematic of an exemplary system including a battery interface circuit including a battery disconnect circuit and load dump protection circuit.

FIG. 5A illustrates an exemplary battery interface circuit 502 including a battery disconnect circuit and load dump protection circuit. Circuit 410 includes a first switch 51 coupled in series with N-channel enhancement-type metal-oxide semiconductor field-effect transistor (MOSFET) Q1. Transistor Q1 is configured to cut off current to zero Amperes when turned off. Components S1 and Q1 are coupled between node 408a (at the high side of capacitor C1) and the positive node of battery 120. Circuit 502 further includes a second switch coupled between node 408b (at the low side of capacitor C1) and the negative node of battery 120.

In some embodiments, switches S1 and S2 are relays. Because the receiver 104 is operating at high current levels, relays may be unable to cut current to zero when attempting to disconnect the battery 120 from the receiver. For example, in a wireless power system configured to transmit 11 kW to a battery, a high current level can be greater than 25 A, greater than 30 A, or greater than 35 A. Therefore, the battery interface circuit 502 may include a MOSFET Q1 that is able to properly cut current while inserting a very small loss (e.g., inefficiency) into the wireless power system 100. In one example, an inexpensive, low voltage MOSFET rated for a maximum of 40 V can be used for Q1.

Figure 5B:
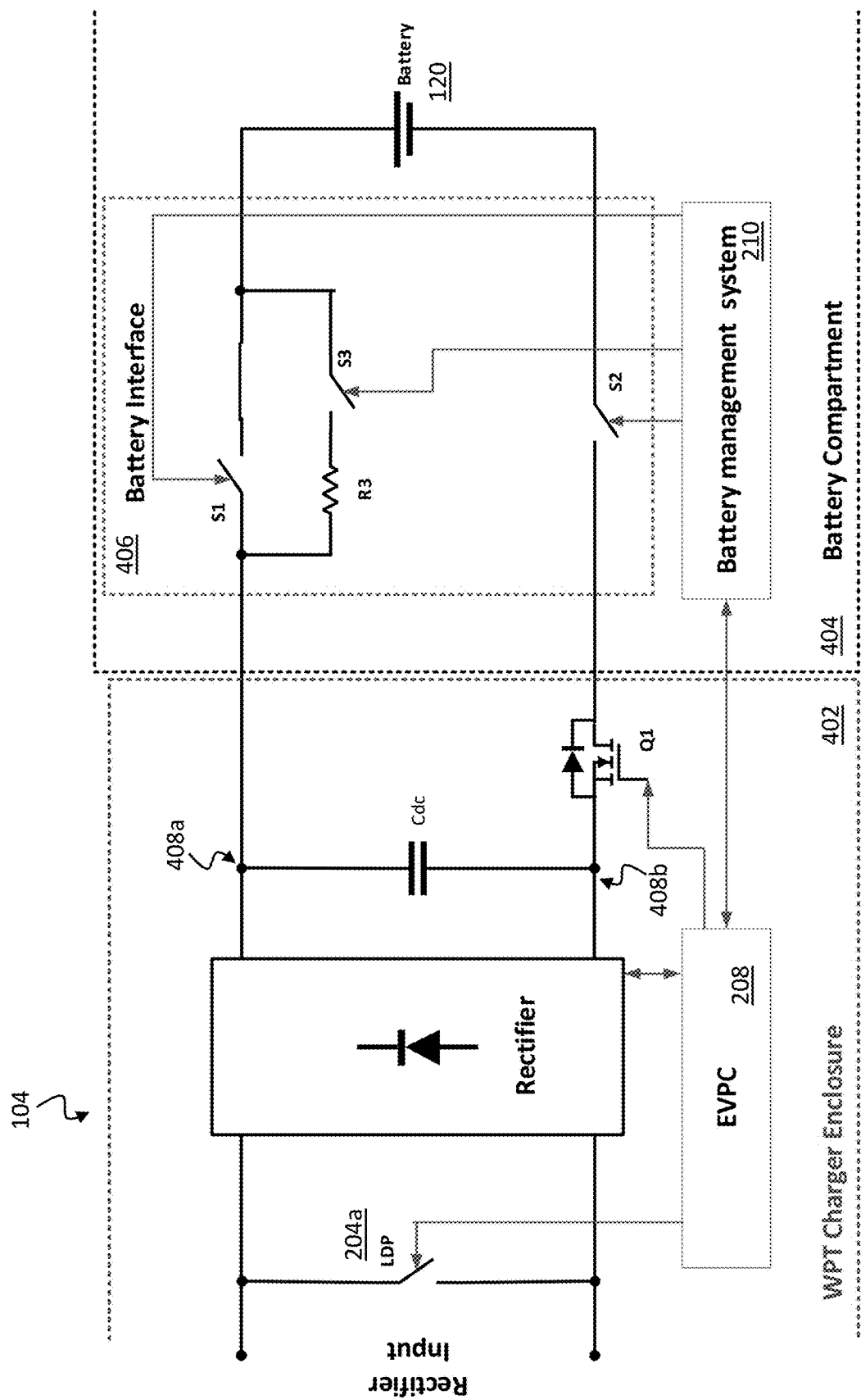

In the exemplary system of FIG. 5B, transistor Q1 is coupled between node 408b and the negative node of battery 120 within charger enclosure 402. In this embodiment, transistor Q1 is controlled by the EVPC 208. The transistor Q1 can be used to reduce the current level to the battery 120 to zero (0) Amperes. In some embodiments, transistor Q1 can be used as rectifier output short-circuit protection.

Figure 5C:
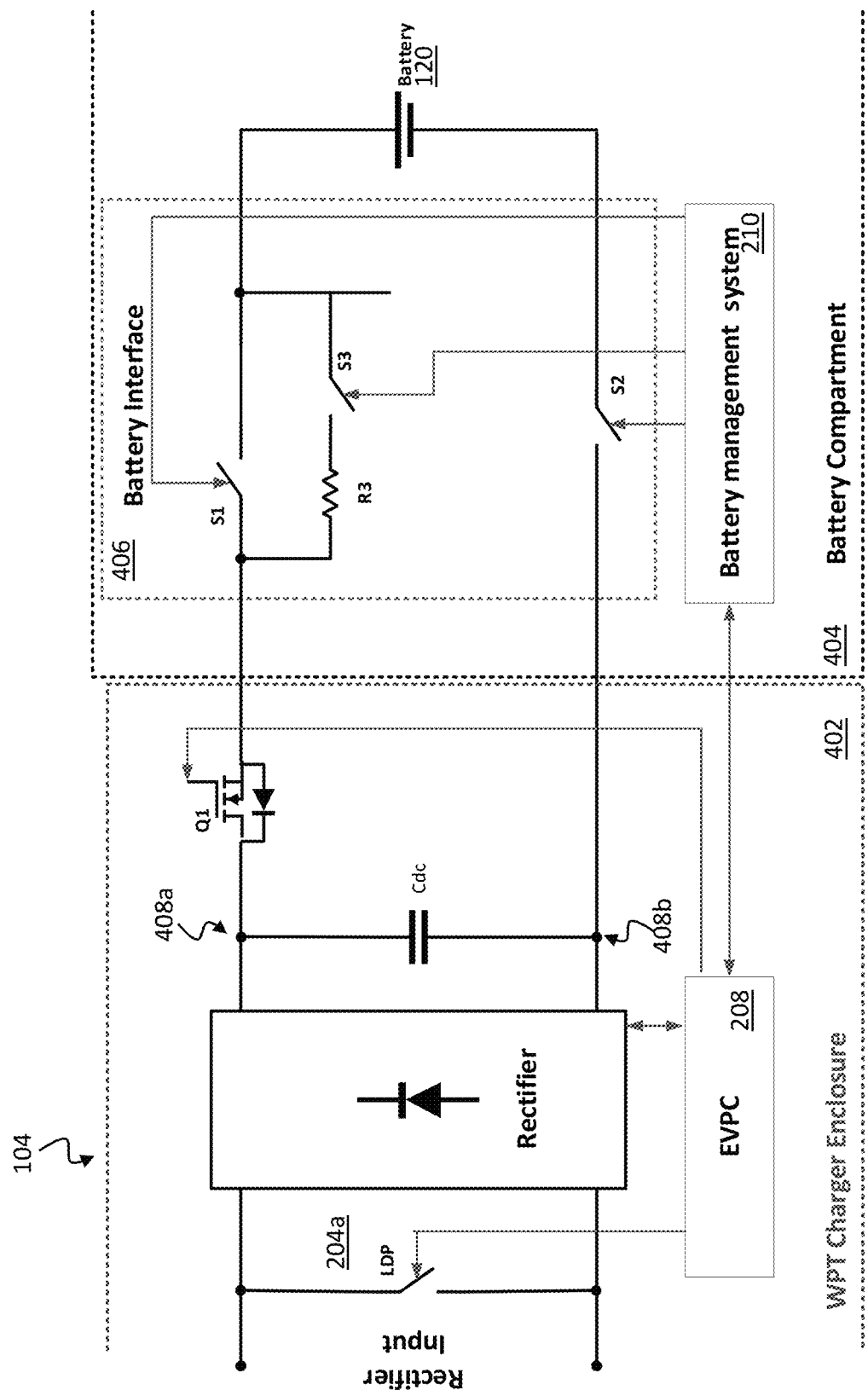

In the exemplary system of FIG. 5C, transistor Q1 is coupled between node 408a and the positive node of battery 120 within charger enclosure 402. In this embodiment, transistor Q1 is controlled by the EVPC 208. The transistor Q1 can be used to cut current to the battery 120 to zero (0) Amperes. In some embodiments, transistor Q1 can be used as rectifier output short-circuit protection.

Note that, in some cases, transistor Q1 is preferably coupled to the bottom branch (between node 408b and the negative node of battery 120) as compared to the top branch (between node 408a and the positive node of battery 120) so that transistor Q1 is referenced to the negative rail of the rectifier and/or so that existing power supply can be used to drive the transistor Q1. This can have the effect of reducing cost in the system.

Figure 5D:
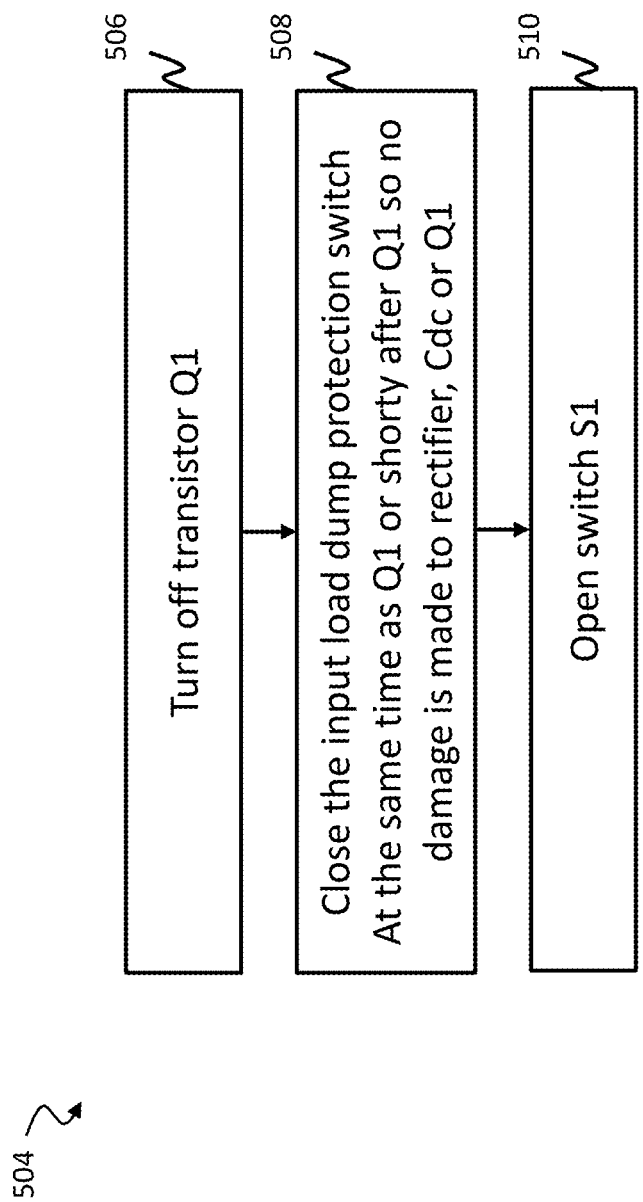
FIG. 5D is a flowchart of an exemplary method to disconnect battery by systems of FIGS. 5A-5C.

FIG. 5D illustrates an exemplary method 504 to disconnect battery 120 by the systems illustrated in FIGS. 5A, 5B, and 5C.

Charging state: Switch S1 is on (closed);
   Optional switch S2 is on (closed);
   MOSFET Q1 is on (short); and
   Input load dump protection (LDP) 204a is off (open).
Step 506—Cut current to battery
   Turn off (open) MOSFET Q1.
   Voltage increases in capacitor C1.
Step 508—Prevent over-voltage condition in MOSFET Q1 by engaging load dump protection circuit
   Turn on (close) relay of input load dump protection circuit 204a.
   Voltage at capacitor C1 is constant or near-constant, or droops slowly through a bleeding resistor.
Step 510—Battery disconnect
   Turn off (open) switch S1; and
   Turn off (open) optional switch S2.

Output Short-Circuit Protection

EXAMPLE 1

In some embodiments, if the output is shorted for any reason, Q1 switch can open and LDP 204a can close, and the current through the short at the output would be cut to zero.

Load Disconnect Protection at Rectifier Input

EXAMPLE 2

Figure 6A:
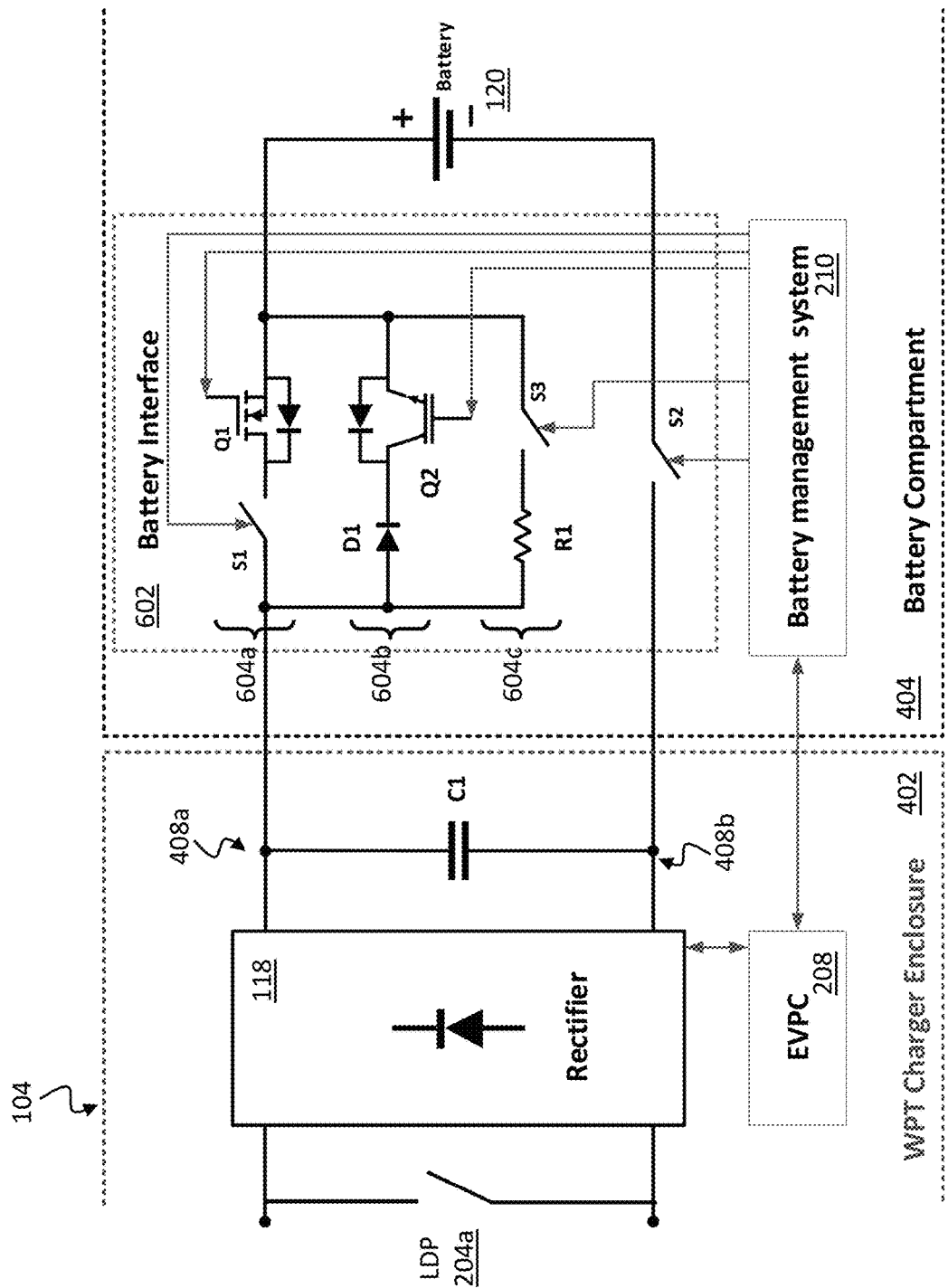
FIG. 6A is a schematic of an exemplary battery interface circuit including a battery disconnect circuit and load dump protection circuit.

FIG. 6A illustrates an exemplary battery interface circuit 602 including a battery disconnect circuit. Circuit 602 includes a first branch 604a coupled between node 408a and the positive node of battery 120. Branch 604a includes a switch S1 and N-channel enhancement-type metal-oxide semiconductor field-effect transistor (MOSFET) Q1. Circuit 602 further includes a second branch 604b coupled in parallel to first branch 604a and including a diode D1 in series with an insulated-gate bipolar transistor (IGBT) Q2. In some embodiments, circuit 602 further includes a third branch 604c (e.g., as a pre-charge circuit) coupled in parallel with branches 604a, 604b and including resistor R1 and switch S3. Coupled between node 408b and the negative node of battery 120 is switch S2. Components S1, S2, S3, Q1, and Q2 can be coupled to a controller (e.g., battery management system 210). Transistors Q1, Q2 are configured to cut off current to zero Amperes when turned off.

Figure 6B:
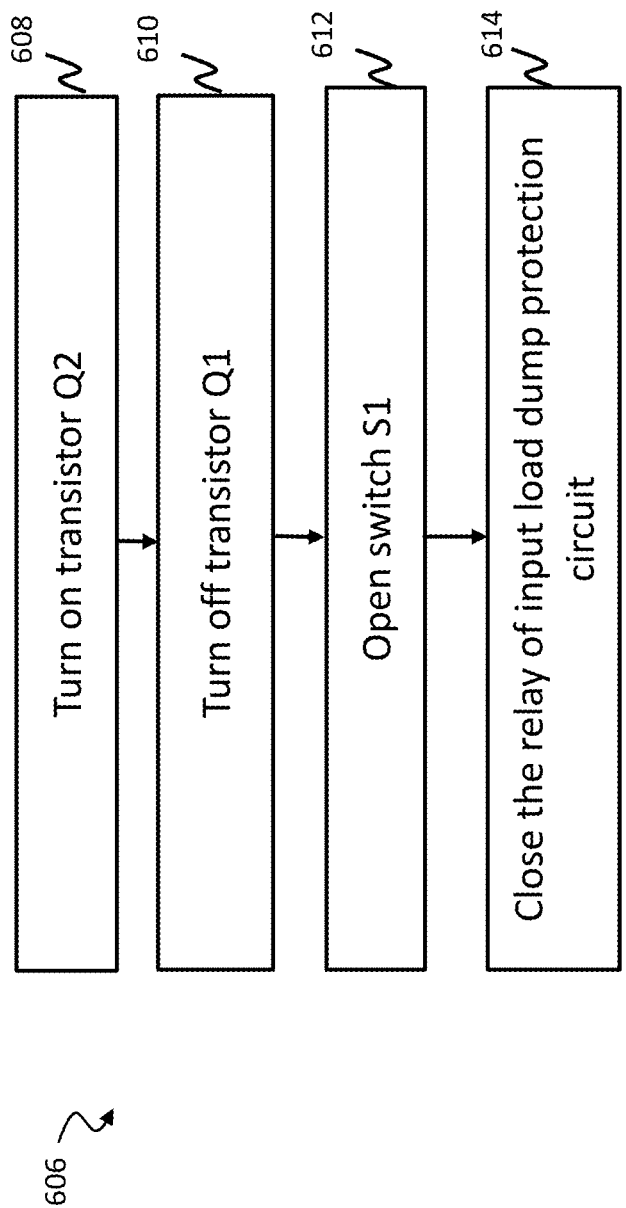
FIG. 6B is a flowchart of an exemplary method to disconnect battery by the exemplary interface circuit of FIG. 6A.

FIG. 6B illustrates an exemplary method 606 to disconnect battery 120 by interface circuit 602. Note that the below process assumes that the third branch 604*c* is not included in circuit 602 or that switch 3 is off (open).

Charging state: Switch S1 is on (closed);
   Optional switch S2 is on (closed);
   MOSFET Q1 is on (short);
   MOSFET Q2 is off (open); and
   Input load dump protection (LDP) 204*a* is off (open).
Step 608—Prepare to disconnect
   Turn on (short) MOSFET Q2.
Step 610—Divert current to diode D1 and MOSFET Q2
   Turn off (open) MOSFET Q1.
   Current flows through diode D1 and MOSFET Q2
Step 612—Battery disconnects
   Turn off (open) switch S1;
   Wait up to several tens of milliseconds for switch S1 to reliably turn-off
   Turn off (open) MOSFET Q2; and
   Turn off (open) optional switch S2.
   Voltage increases at capacitor C1.
Step 614—Load dump protection engages
   Turn on (close) relay of input load dump protection circuit 204*a*.
   Turning on of the input circuit 204*a* prevents an over-voltage condition (and consequent damage) in capacitor C1.

Figure 6C:
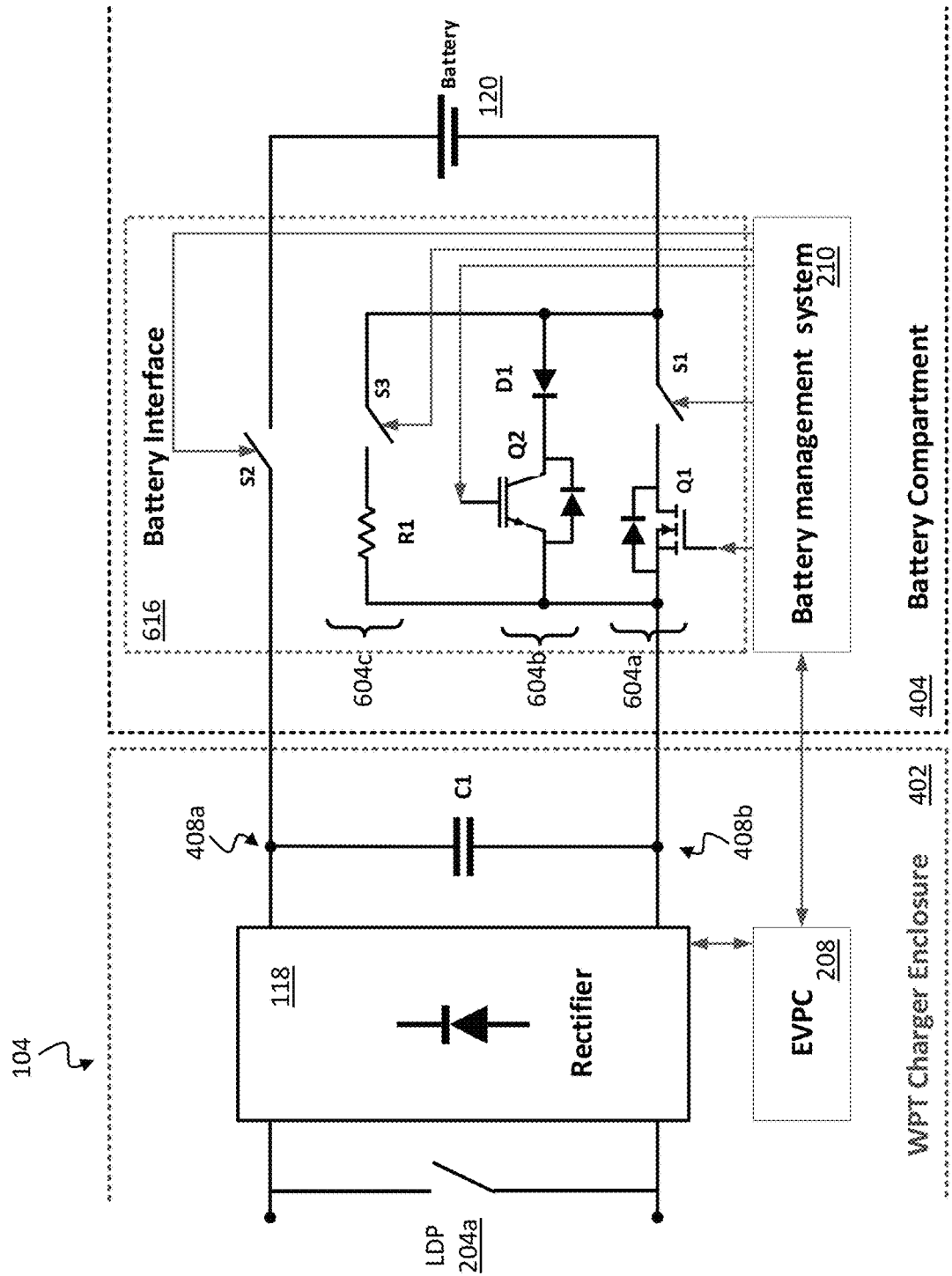
FIG. 6C is a schematic of a receiver coupled to a mirror-image version of the interface circuit of FIG. 6A.

FIG. 6C illustrates a mirror-image version 616 of the circuit 602 of FIG. 6A. In circuit 616, first branch 604*a* is coupled between node 408*b* and negative node of battery 120. As discussed above, second branch 604*b* is coupled in parallel to branch 604*a*. In some embodiments, circuit 506 can include a third branch 604*c* coupled in parallel to branches 604*a* and 604*b*. One advantage to the mirror-image circuit 616 is that it is referenced to the negative side of capacitor C1 (at node 408*b*). This avoids the need for an isolated gate driver at MOSFET Q1.

Load Dump Protection at Rectifier Output

EXAMPLE 1

Figure 7A:
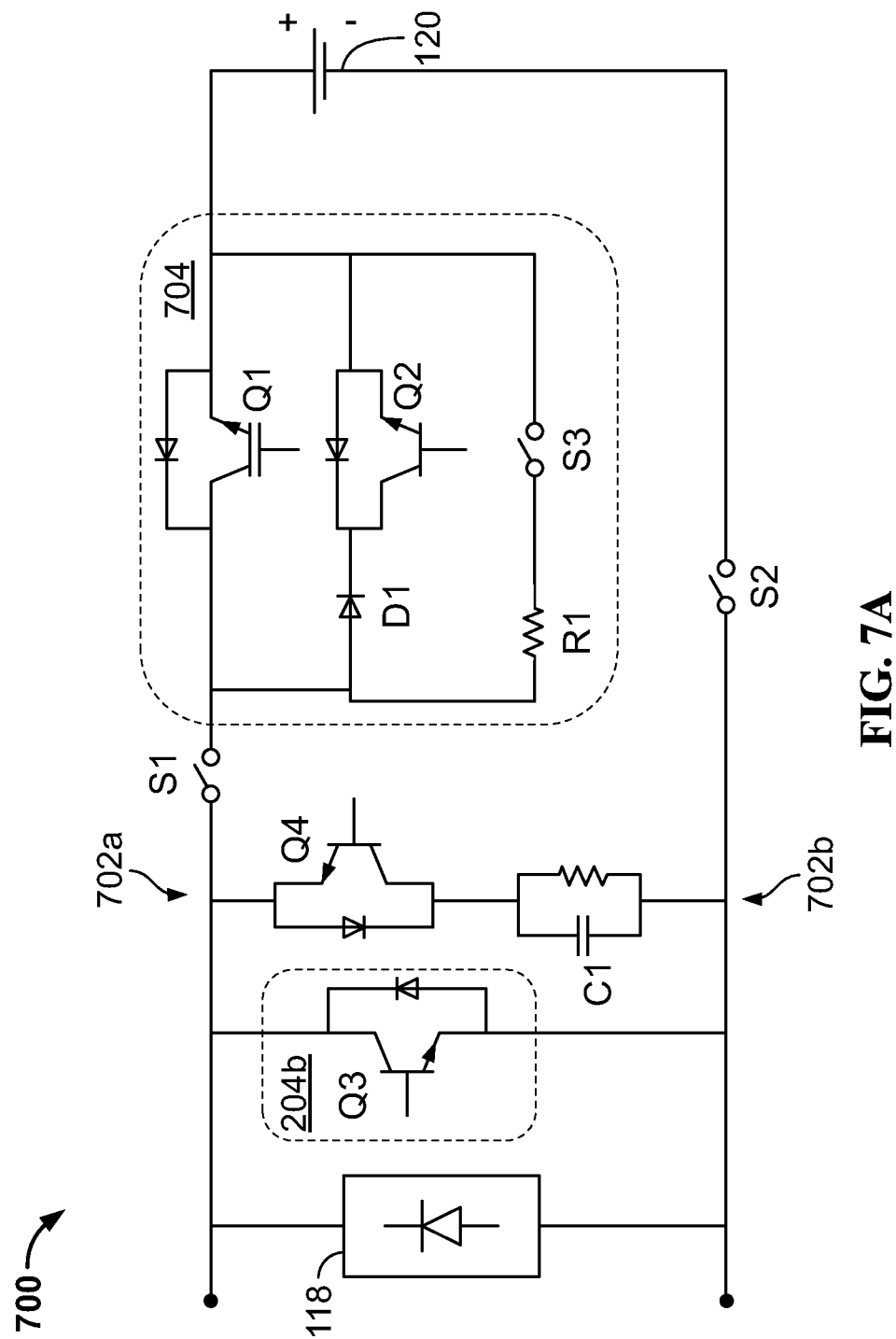
FIG. 7A is a schematic of an exemplary interface between a wireless power receiver and battery in which the load dump protection circuit is coupled to the output of the rectifier.

FIG. 7A illustrates an exemplary interface 700 between a wireless power receiver 104 and battery 120 in which the load dump protection circuit 204*b* is coupled to the output of the rectifier 118. In this example, the load dump protection circuit 204*b* includes a metal-oxide semiconductor field-effect transistor (MOSFET) Q3 connected in parallel to the output of rectifier 118. Connected in parallel to Q3 is the output capacitor C1 in series with IGBT Q4. Coupled between node 702*a* and the positive node of battery 120 is circuit 704 configured to disconnect the battery 120 from receiver 104. Circuit 704 includes a MOSFET Q1 coupled in parallel to IGBT Q2. IGBT Q2 is coupled in series with diode D1. Diode D1 may prevent the battery 120 from conducting current through the body-diode of IGBT Q2. In some embodiments, circuit 704 includes a subcircuit in parallel with D1 and Q2. The subcircuit can include resistor R1 and switch S3. The interface 700 further includes a switch S1 coupled between node 702*a* and circuit 704. In some embodiments, the interface 600 further includes switch S2 coupled between node 702*b* and the negative node of battery 120. Transistors Q1, Q2, Q3, and Q4 are configured to cut off current to zero (0) Amperes when turned off.

Figure 7B:
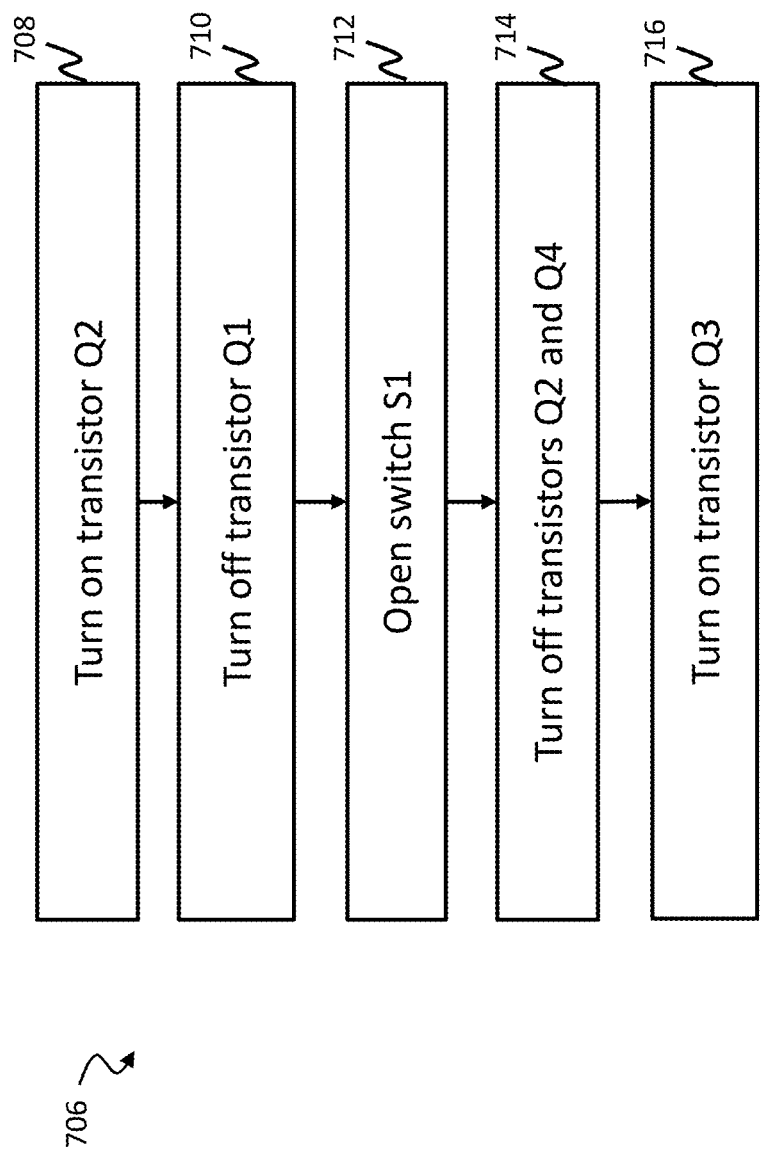
FIG. 7B is a flowchart of an exemplary method to disconnect battery by the exemplary interface circuit of FIG. 7A.

FIG. 7B illustrates an exemplary method 706 to disconnect battery 120 by interface circuit 700.

Initial state: MOSFET Q1 is on (short);
   IGBT Q2 is off (open);
   MOSFET Q3 is off (open);
   IGBT Q4 is on (short);
   Switch S1 is on (closed); and
   Optional switch S2 is on (closed).
Steps 708 and 710—Current flows through diode D1
   Turn on (short) IGBT Q2.
   Shortly after, turn off (open) MOSFET Q1.
   Rectified current goes through diode D1 and IGBT Q2.
Step 712 and 714—Battery disconnects
   Turn off (open) switch S1;
   Wait for several tens of milliseconds for switch S1 to reliably turn off
   Turn off (open) IGBTs Q2 and Q4; and
   Turn off (open) optional switch S2.
   Voltage at capacitor C1 increases.
Step 716—Load dump protection engages
   Turn on (short) MOSFET Q3.
   Voltage on C1 is bled by a bleeding resistor In some embodiments, in step 716 above, IGBT Q4 may have some circulating current. Therefore, the load dump protection circuit 204*b* engages (i.e., Q3 turns on) after circuit 604 disconnects (i.e., Q1 and Q2 are open) the battery 120.

Load Dump Protection at Rectifier Output

EXAMPLE 2

Figure 8:
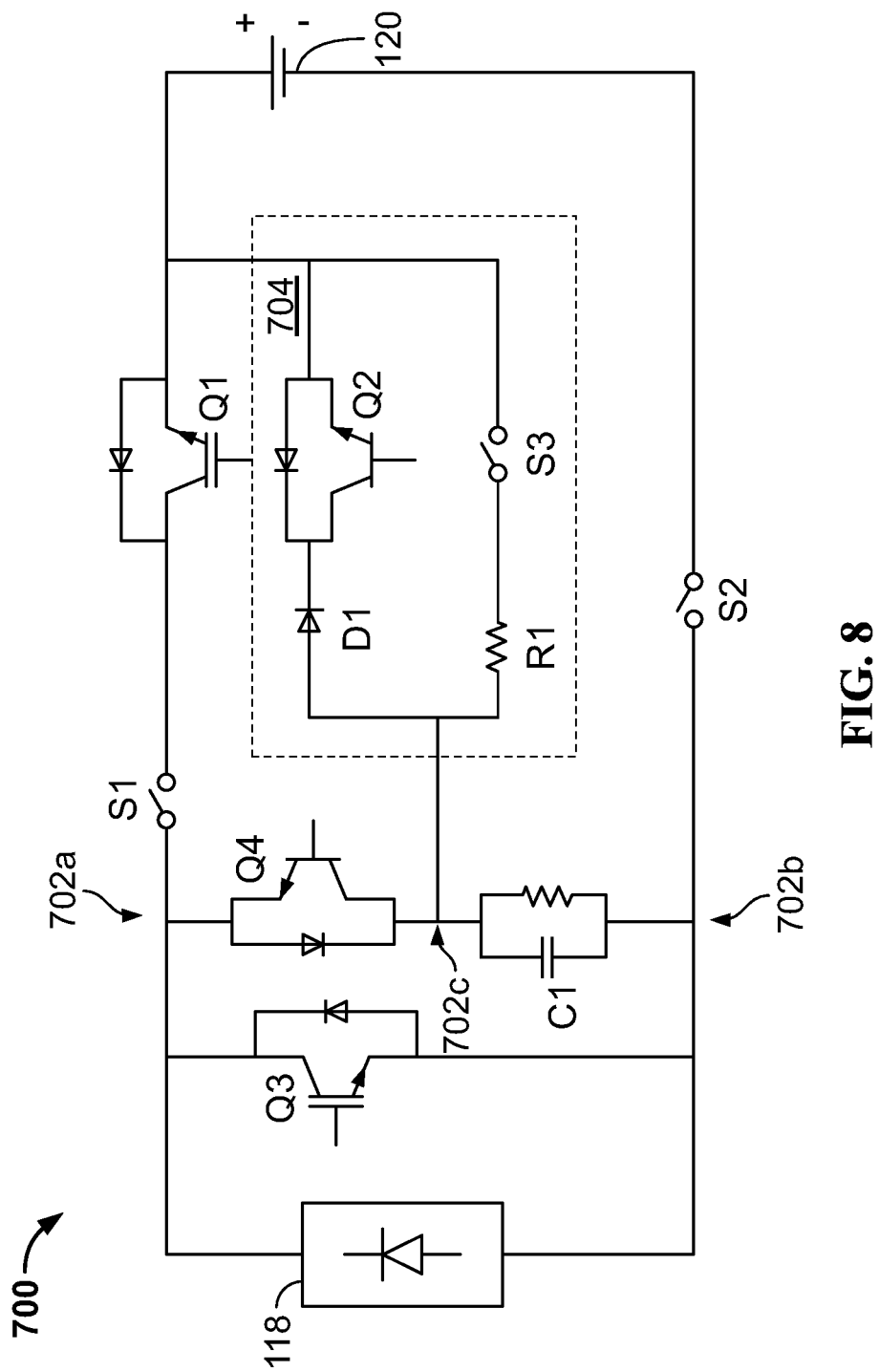
FIG. 8 is a schematic of an exemplary interface between a wireless power receiver and battery in which the load dump protection circuit is coupled to the output of the rectifier.

FIG. 8 illustrates an exemplary interface 600 between a wireless power receiver 104 and battery 120 in which the load dump protection circuit 204*b* is coupled to the output of the rectifier 118. In this example, the load dump protection circuit 204*b* includes a MOSFET Q3 connected in parallel to the output of rectifier 118. Connected in parallel to Q3 is the output capacitor C1 in series with IGBT Q4. Coupled between node 702*a* and the positive node of battery 120 is transistor (e.g., MOSFET or insulated-gate bipolar transistor (IGBT)) Q1. Coupled between the positive node of battery 120 and node 702*c* is circuit 704. Circuit 704 includes a top branch including a IGBT Q2 coupled in series with diode D1. In parallel to the top branch is the bottom branch including a switch S3 (e.g., a low voltage switch) in series with resistor R1. The interface 700 further includes a switch S1 coupled between node 702*a* and MOSFET Q1. In some embodiments, the interface 700 further includes switch S2 coupled between node 702*b* and the negative node of battery 120. Transistors Q1, Q2, Q3, and Q4 are configured to cut off current to zero Amperes when turned off.

The following exemplary method can be used in connecting and disconnecting battery 120 from receiver 104.

Pre-power operation. During this phase, one goal is to connect the battery 120 to the rectifier 118 and smoothing capacitor C1 without damage to any components. It is important to ensure that, before connecting the battery 120 to the rectifier 118, the positive node of the battery 120 is connected to a high node (e.g., node 702*a*) to prevent an in-rush current and prevent transients in the wireless power system 100. To prevent the in-rush current and transients, circuit 704 is coupled between the positive node of the battery 120 and node 702*c*. During this phase, switches S3 and S2 are closed, allowing the capacitor C1 to charge from battery 120.

Note that the remaining switch S1 and the transistors Q1, Q2, Q3, and Q4 remain open.

Charging operation. Once capacitor C1 is charged, then the rectifier 118 can power the battery 120 as in-rush currents (at switch S1) can be minimized or prevented. During charging, switch S3 and transistors Q2, Q4 are open while switch S1 and transistors Q1, Q4 are closed. In some embodiments, transistors Q1 and Q4 are closed before switch S1. This allows the battery 120 to be charged. In some embodiments, switch S3 and transistors Q2, Q4 can remain closed though they induce losses during the charging phase. In some embodiments, the controller can monitor the charge on capacitor C1 by monitoring the voltage across and/or current through capacitor C1. During charging, capacitor C1 acts as a smoothing capacitor configured to filter the rectifier output.

Command to disconnect load. A command to disconnect the battery 120 may be sent to the receiver controller (e.g., EVPC 208) because the battery 120 has finished charging, or because of a fault in the wireless power transmitter 102 or receiver 104. It is important that switch S1 is not opened while a high voltage is across it. After the controller issues a command to disconnect the battery, switch S3 and transistor Q3 are opened. Then, transistor Q2 is closed to divert charging through Q2. Alternatively or additionally, the current through transistor Q2 goes through shorted transistor Q4 and/or the diode in parallel with Q4. Next, low voltage transistor Q1 can be opened. Then, switch S1 can be opened when there is a low voltage (e.g., less than 5 V, less than 2 V, etc.) across switch S1. Subsequently or contemporaneously, transistors Q4 and Q2 can be opened to stop charging the battery 120. If wireless power transmitter 102 has not shut off power and there is coupling between transmitter 102 and receiver 104, capacitor C1 will charge. Once the C1 capacitor charges, the rectifier 118 can be shorted for protection by shorting transistor Q3.

Exemplary Receiver Coil Disconnect Circuits

Figure 9A:
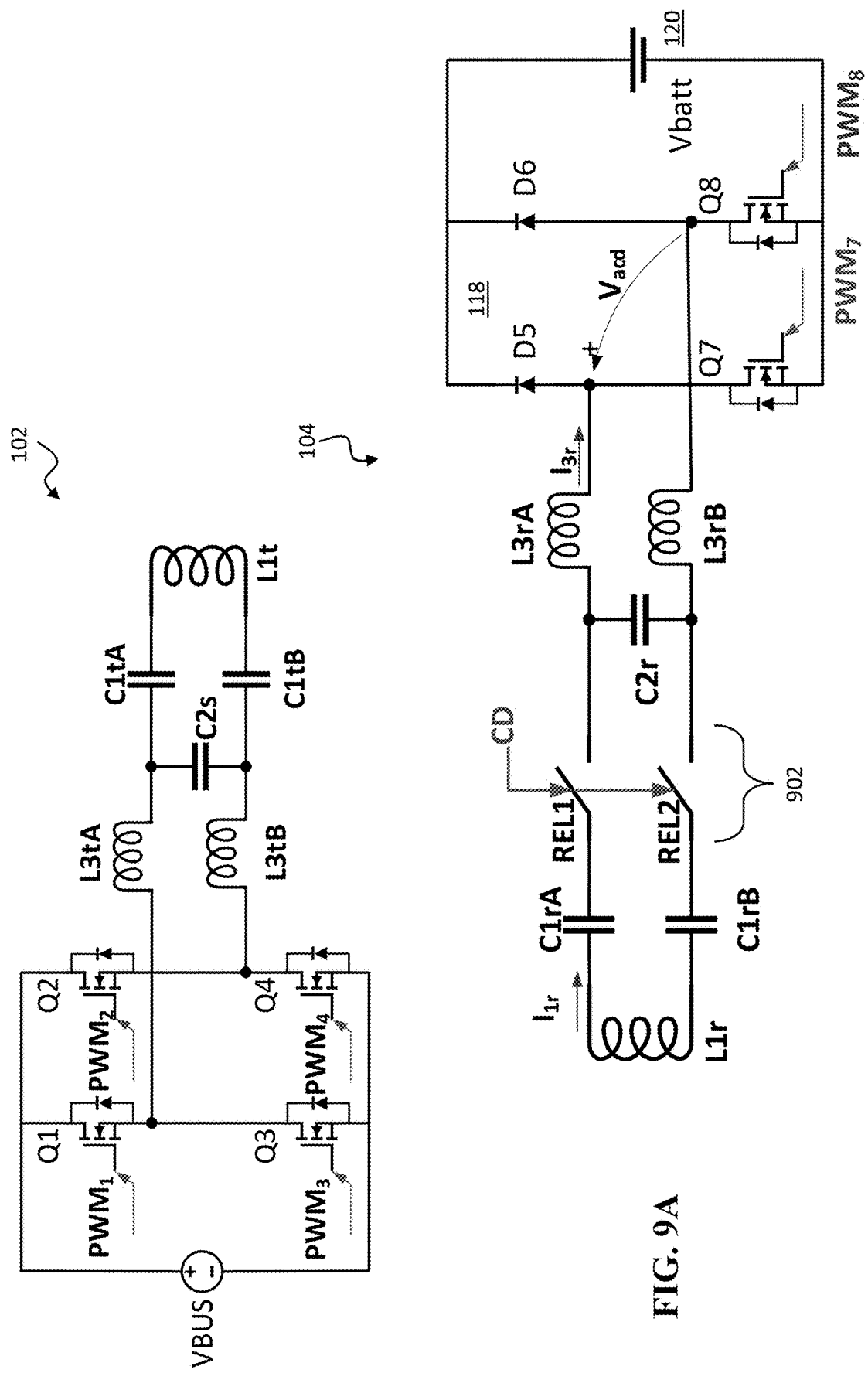
FIG. 9A is a schematic of an exemplary wireless power system including a receiver with an exemplary coil disconnect circuit.

FIG. 9A illustrates a wireless power system 100 including a wireless power receiver 104 having an exemplary coil disconnect circuit 902. The exemplary coil disconnect circuit 902 includes at least one switch or relay (e.g., REL1 and/or REL2) Exemplary relays for the coil disconnect circuit 902 for high power wireless power receiver (e.g., configured to deliver tens of kW to a battery 12) include relays rated for one thousand or more volts. An exemplary relay can be configured to conduct the full coil current when turned on (closed) and/or can be configured to support a high voltage on the order of hundreds of volts across its power terminals when the relay is turned off (open). In some embodiments, one relay (e.g., REL1 or REL2) may be used in the coil disconnect circuit 902 to reduce current (e.g., to zero or near zero) in the receiver 104. In some embodiments, two relays (e.g., REL1 and REL2) may be used to reduce (e.g., to zero or near zero) the voltage potential in the receiver 104 so as to galvanically isolate the receiver 104 from the vehicle. The relays REL1 or REL2 may be coupled in the top branch or bottom branch of the receiver 104. In some embodiments, the coil disconnect circuit 902 includes both a relay REL1 in the top branch and a relay REL2 in the bottom branch.

Figure 9B:
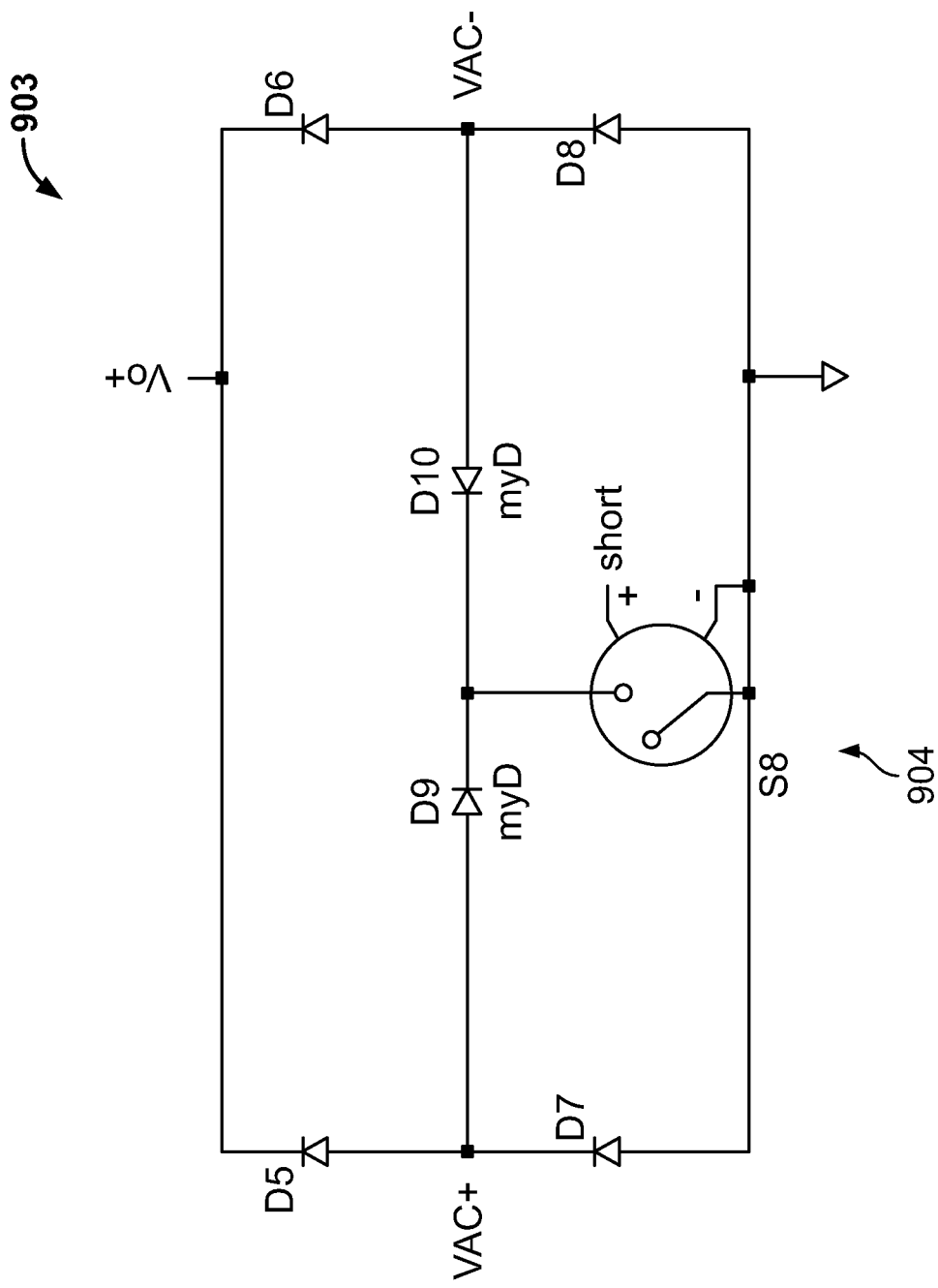
FIG. 9B is a schematic of an exemplary rectifier for a wireless power receiver.
Figure 11:
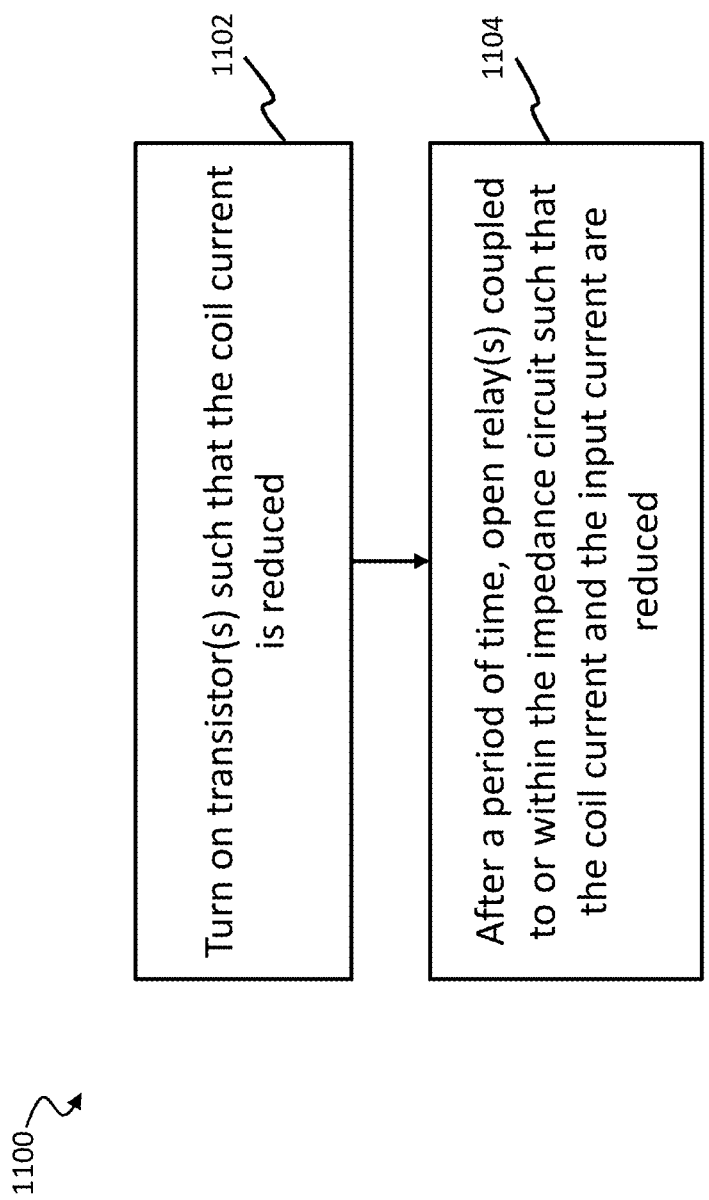
FIG. 11 is a flowchart of an exemplary method for protecting a wireless power receiver via a coil disconnect circuit.

In various embodiments, the relay REL1, REL2 are controlled by a coil disconnect signal CD, which may be provided by a controller (e.g., controller 126 and/or EVPC 208) coupled to the switches REL1, REL2. FIG. 9B is a schematic of an exemplary rectifier 903 including a single transistor 904. This single transistor 904 can be configured to enable the protection systems and methods described herein. Note that this rectifier 903 may be employed in place of rectifier 118 in FIG. 9A. In particular, the rectifier 903 can be coupled at nodes having voltages VAC+, VAC−. FIGS. 10A-10F are a set of plots illustrating various exemplary signals in the receiver 104 relating to the protection of the receiver 104 via the coil disconnect circuit. FIG. 11 is a flowchart of an exemplary method for protecting the receiver 104 via a coil disconnect circuit.

For the sake of simplicity, the following discussion refers to FIGS. 9-11 together. Additionally, the exemplary methods (e.g., method 1100) described herein may be used with coil disconnect circuits of FIGS. 12-14.

In step 1102 of method 1100, transistor(s) Q7, Q8 (or 904) are turned on (shorted). This can cause the coil current $I_{1r}$ to reduce to or near zero Amperes. In some embodiments, the turning on of transistors Q7, Q8 (or 904) may cause the input current $I_{3r}$ to the rectifier to increase. This behavior results at least in part to the configuration of the impedance circuit coupled between the resonator coil L1r and the rectifier 118. In particular, the impedance circuit can include: (a) a first set of capacitors C1rA and/or C1rB in series with the resonator coil L1r; (b) a second set of capacitors C2r in parallel with the resonator coil L1r; and (c) one or more inductors L3rA and/or L3rB coupled between the capacitors C2r and the rectifier 118. The first set of capacitors C1rA and/or C1rB has a first reactance X1r; the second set of capacitors C2r has a second reactance X2r; and the inductors L3rA and/or L3rB have a third reactance X3r. In some embodiments, the impedance circuit may also include one or more capacitors in series with inductors L3rA and/or L3rB. These capacitor(s) may be coupled (i) in series between C2r and inductors L3rA, L3rB and/or (ii) coupled between inductors L3rA, L3rB and the input of the rectifier 118. In some embodiments, the values of the capacitors and/or inductors L3rA, L3rB can be selected such that, when combined with the other components of the impedance circuit, the total reactance of the impedance circuit remains the same (as without these series capacitors). Note that, in some embodiments, there may be other impedance matching configurations that, when transistors Q7, Q8 (or 904) are shorted, the coil current I1r is reduced to or near zero.

In this embodiment, the reactance of the receiver 104 is equal to the absolute value of the first reactance, the absolute value of the second reactance, and the absolute value of the third reactance, as follows:

$$X_{receiver} = |X_{1r}| = |X_{2r}| = |X_{3r}|$$

$$X_{receiver} = \omega L_{1r} - \frac{1}{\omega C_{1r}} = \frac{1}{\omega C_{2r}}$$

$$X_{receiver} = \omega L_{3r}$$

The impedance of the wireless power system can be used illustrate the effect of shorting (turning on) the transistors Q7, Q8 (or 904), as follows. The relationship between the receiver impedance circuit (as discussed above) and the mutual impedance XM between the transmitter 102 coil L1t and the receiver 104 coil L1r can be defined as follows:

$$I_{1r}\left(X_{1r} + \frac{X_{2r}(X_{3r} + R_{ac})}{X_{2r} + (X_{3r} + R_{ac})}\right) = X_M I_{1t}$$

where $R_{ac}$ is the equivalent resistance of the active rectifier 118. If transistors Q7 and Q8 (or 904) are shorted, then $R_{ac}$ goes to zero. Accordingly, the term $$\frac{X_{2r}(X_{3r} + R_{ac})}{X_{2r} + (X_{3r} + R_{ac})}$$

goes very high because $|X_{2r}|=|X_{3r}|$. Therefore, current $I_{1r}$ goes to zero since $X_M I_{1t}$ has a finite value. With $R_{ac}=0$, the following equation expresses the relationship between the transmitter coil current I1t and input current I3r:

$$I_{3r}\left(X_{1r} + (X_{3r} + R_{ac}) + \frac{X_{1r}(X_{3r} + R_{ac})}{X_{2r}}\right) = I_{3r}(X_{1r}) = X_M I_{1t}$$

illustrating that I3r can go high and lead to overheating of transistors Q7, Q8 (or 904) and/or inductors L3rA, L3rB. Note that, in some embodiments, if there exists an impedance mismatch in the receiver 104, the current I1r may not reduce completely to zero and may instead reduce to a current value of approximately one (1) Amperes or less, depending on the parameters of the wireless power receiver (e.g., component values of the impedance circuit, current, voltage, and/or power levels, etc.).

In FIG. 10A, the voltage signal 1002 (e.g., PWM7, PWM8) is used to short transistors Q7, Q8 (or 904) at time t1. At approximately time t1, in FIG. 10B, the voltage 1004 across the input of the rectifier 118 goes to zero or near zero. In FIG. 10C, the input current I3r 1006 to the rectifier 118 increases after time t1. FIG. 10D shows that the coil current I1r 1008 goes to zero or near zero.

In step 1104, after a period of time (e.g., between time t1 and time t2), the relays REL1 and/or REL2 are opened such that the coil L1r disconnects and the coil current I1r and the input current I3r are reduced to zero or near zero. During this period of time, the coil current may drop to a small value, e.g., 1 $A_{RMS}$, such that the relays REL1 and/or REL2 can be opened safely. FIG. 10E illustrates the signal CD 1012 opening relays REL1 and/or REL2 at time t2. Note that at time t2, the coil current I1r 1008 should be low enough to enable the relays REL1, REL2 to safely and/or reliably turn off (open). In some embodiments, the period of time between time t1 and time t2 can be between 1 millisecond to 1 second. In an exemplary embodiment, the period of time is approximately 1 ms, 2 ms, 3 ms, 4 ms, 5 ms, 10 ms, 20 ms, 50 ms, etc. It is beneficial for the receiver 104 that a period of time passes before opening the relays REL1 and/or REL2. As illustrated in FIG. 10F, the receiver coil L1r voltage (signal 1010) reduces at time t1 as a result of reduced current. In other words, the period of time allows for current to decrease in the receiver coil L1r, thereby making it safer to open the relay(s). FIG. 10C illustrates that the input current I3r (signal 1006) goes to zero or near zero. Once both coil current I1r and input current I3r are reduced to zero or near zero, the wireless power receiver 104 is in a relatively safe state and overheating is prevented. In particular, the receiver coil L1r becomes isolated from the rest of the receiver 104, the battery 120, and/or the vehicle, thereby increasing safety for the vehicle as discussed above.

Figure 12:
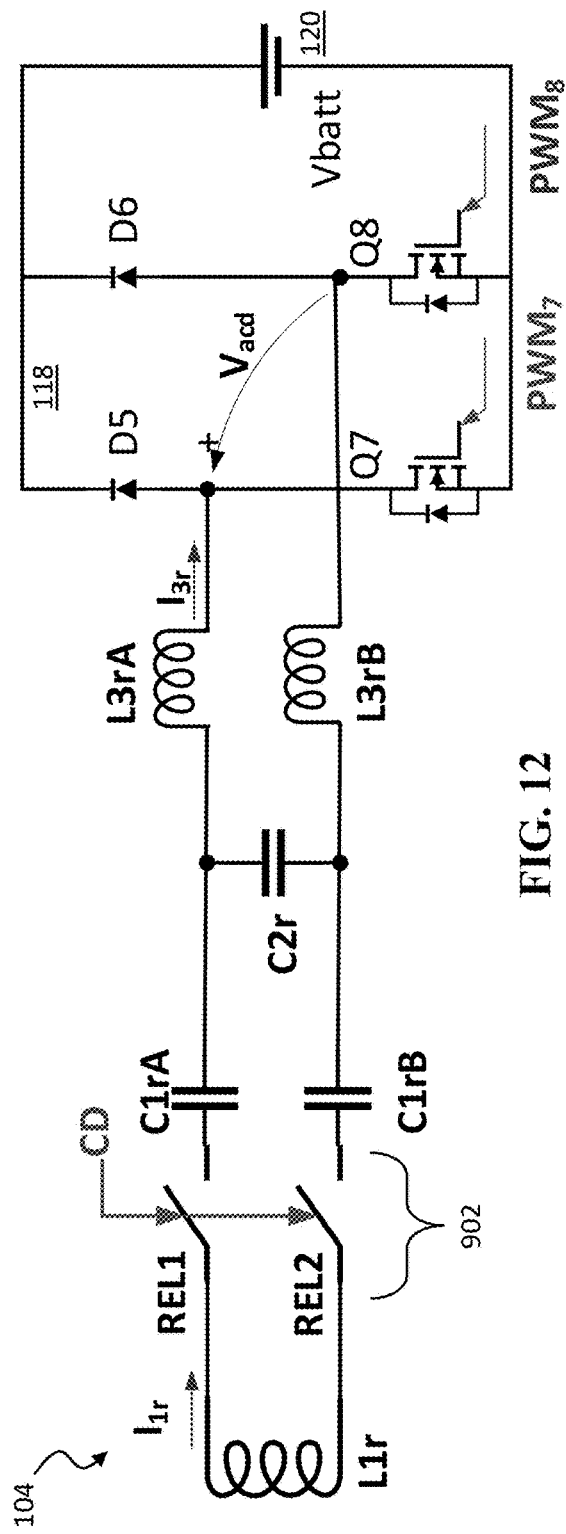
FIGS. 12-14 are schematics of wireless power receivers including various exemplary coil disconnect circuits.
Figure 13:
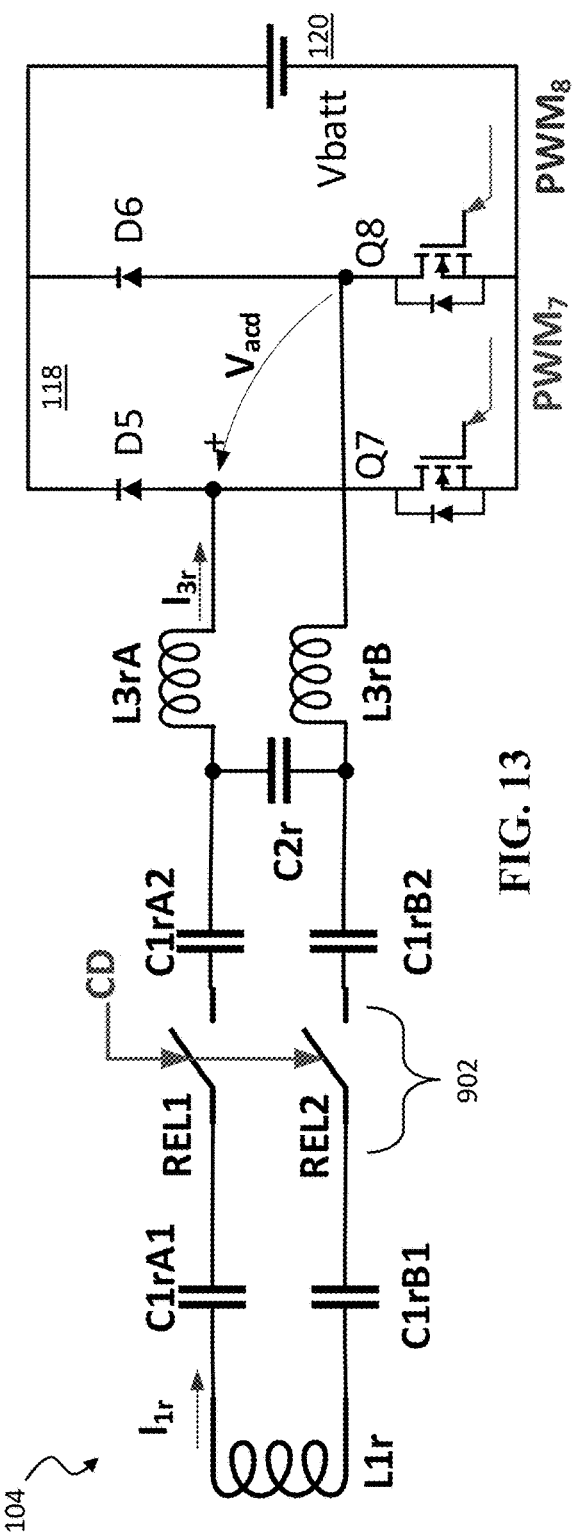
Figure 14:
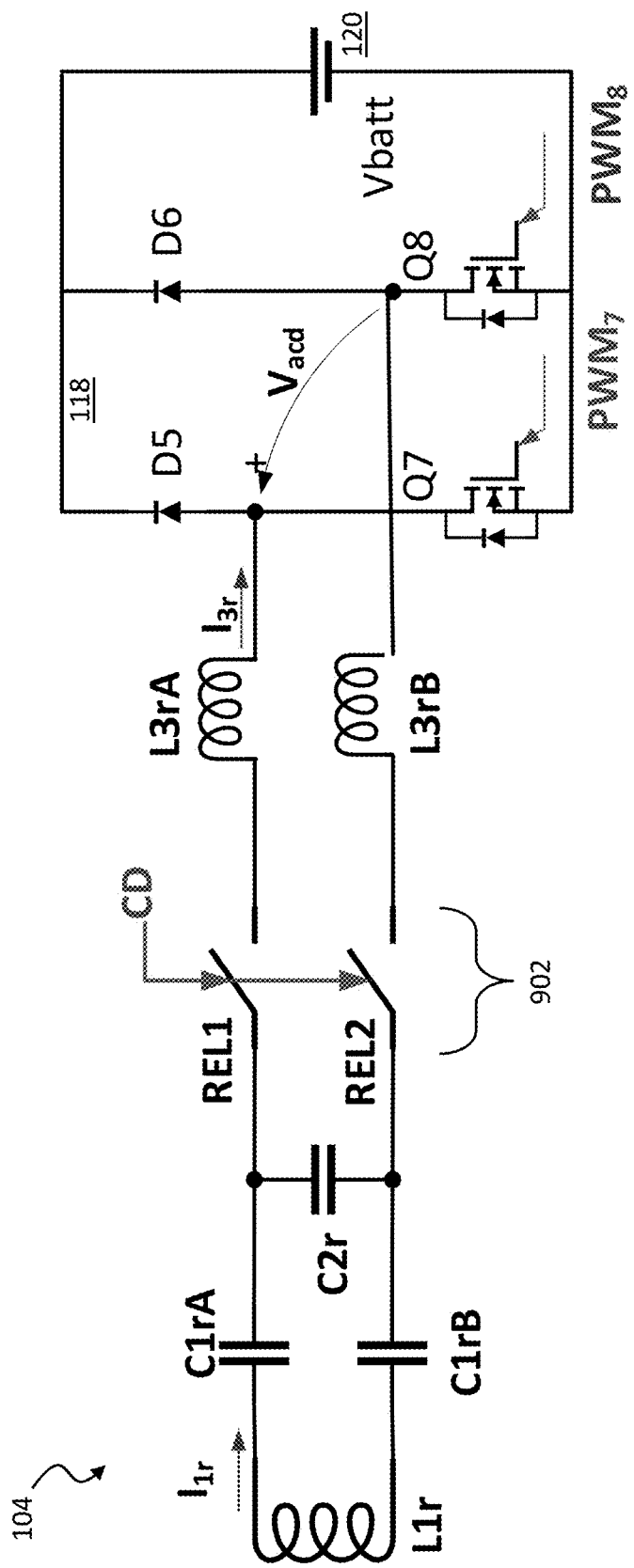

In the exemplary embodiment illustrated in FIG. 9A, the switches REL1 and/or REL2 are coupled between the first set of capacitors (e.g., C1rA or C1rB) and the second set of capacitors (e.g., C2r). FIG. 12 illustrates an exemplary embodiment of the coil disconnect circuit 902 in which the relays REL1 and/or REL2 are coupled between the receiver coil L1r and the first set of capacitors C1rA, C1rB. Note that if one or more relays are configured adjacent to the receiver coil L1r, the relays may need a higher voltage rating as compared to being positioned adjacent to the first set of capacitors C1rA, C1rB (or subsets C1rA1, C1rB1) nearer C2r. FIG. 13 illustrates an exemplary embodiment of the coil disconnect circuit 902 in which the relays REL1 and/or REL2 are coupled between a first subset of capacitors C1rA1, C1rB1 and a second subset of capacitors C1rA2, C1rB2. FIG. 14 illustrates an exemplary embodiment of the coil disconnect circuit 902 in which the relays REL1 and/or REL2 are coupled between the second set of capacitors C2r and inductors L3rA. Note that, in each of the impedance circuits for FIGS. 9 and 12-14, the reactance components in the top and bottom branches are not necessarily balanced. In other words, in some examples, only the top branch may have capacitors C1rA (without a corresponding bottom branch capacitor C1rB), only the bottom branch may include an inductor L3rB (without a corresponding top branch capacitor L3rA), etc. In some embodiments, relay REL1 and relay REL2 may be positioned in a non-symmetrical manner. For example, relay REL1 may be coupled between the receiver coil L1r and capacitor(s) C1rA and relay REL2 may be coupled between capacitor(s) C1rB and capacitor(s) C2r.

Active Rectification in Wireless Power Receivers

In exemplary wireless power receivers, active rectification can be used to generate the desired DC signal for powering a load or charging a battery 120. Active rectification employs actively controlled switches coupled so as to form a rectifier. Switches can include transistors (e.g., FETs, MOSFETs, BJTs, IGBTs, etc.). In an exemplary wireless power system, an active rectifier can be used to convert oscillating current (AC) received at the wireless power receiver to direct current (DC), which can be used to ultimately transfer energy to a load, as described further below.

Figure 15:
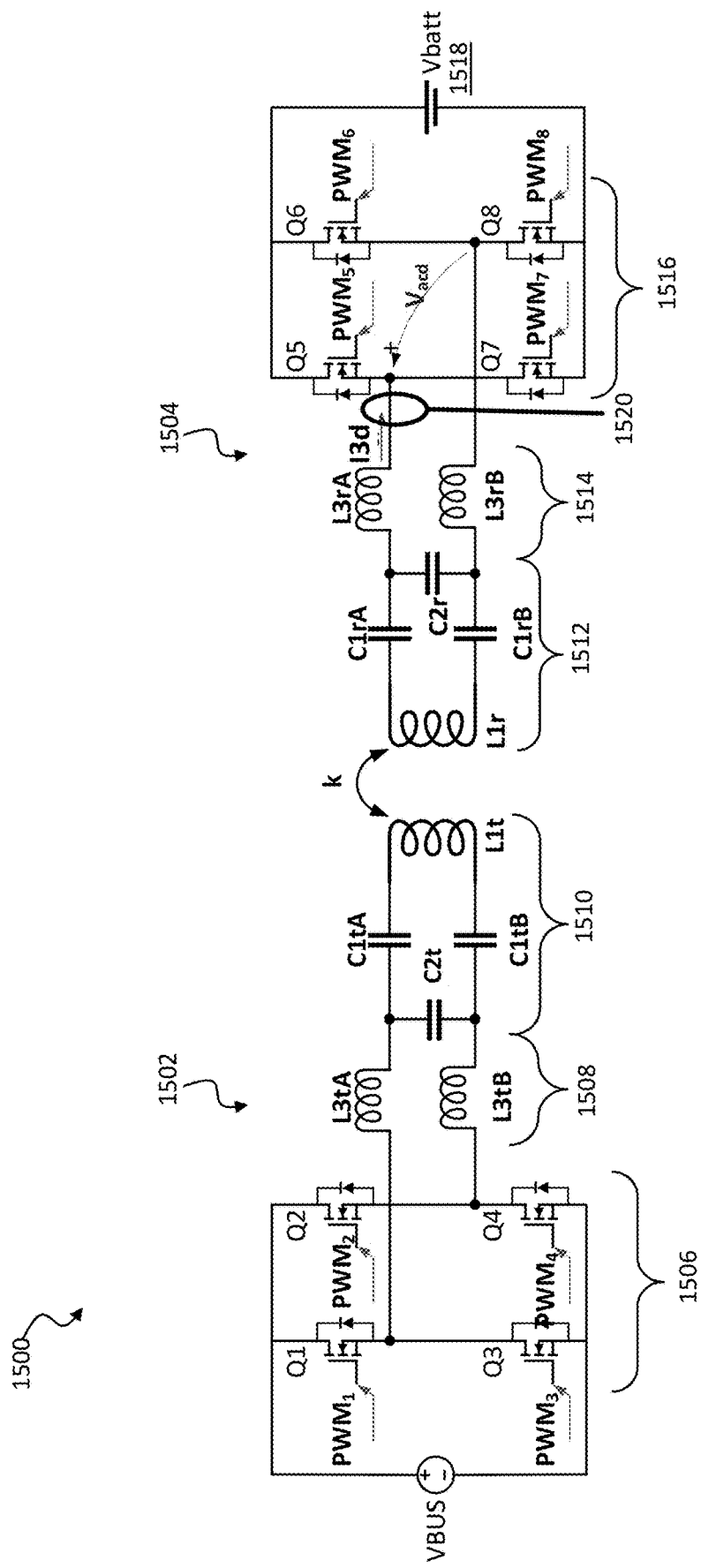
FIG. 15 is a schematic of an exemplary wireless power system utilizing active rectification.

FIG. 15 is a schematic of an exemplary wireless power system 1500 utilizing active rectification. The exemplary system 1500 includes a wireless power transmitter 1502 and receiver 1504. The exemplary transmitter 1502 includes an inverter 1506 (e.g., a half-bridge inverter, a full-bridge inverter, etc.) coupled to a filter circuit 1508 (which can include, e.g., one or more inductive components L3tA, L3tB, one or more capacitive components, etc.). The inverter 1506 can include two or more switches (e.g., transistors Q1, Q2, Q3, and Q4). The switches Q1, Q2, Q3, Q4 can be controlled via respective control signals PWM1, PWM2, PWM3, PWM4. The filter 1508 can be further coupled to a transmitting resonator and/or matching circuit 1510 (including capacitors C2t, C1tA, C1tB, and resonator coil L1t), as described above.

In this exemplary system 1500, the resonator coil L1t of circuit 208 can be inductively coupled to the resonator coil L1r of receiving resonator and/or matching circuit 1512 (including capacitors C1rA, C1rB, C2r, and inductor L1r) so as to wirelessly transmit power from the transmitter 1502 to the receiver 1504. Note that the transmitter coil L1t generates an oscillating magnetic field, which can induce an oscillating current at the receiver coil L1r. This current can have a frequency of, for example, 85 kHz. In many instances, the current I3r can include harmonics due to the inverter 1506. In some embodiments, characteristics (e.g., phase, amplitude, shape, harmonic content, etc.) of the current I3r can be further influenced (e.g., shaped, distorted, etc.) by one or more components of the receiver 1504. For example, circuits 1512 and 1514 can include inductive and/or capacitive components that can alter the phase or shape of the current I3r. In some cases, the distortions of the current I3r can create challenges in operating the rectifier switches, as described further below.

The exemplary receiver 1504 can include filter circuit 1514 (including, e.g., one or more inductive components L3rA, L3rB, one or more capacitive components, etc.) coupled to the receiving resonator and/or matching circuit 1512. The filter circuit 1514 can change characteristics (e.g., reduce distortions) of the current I3r.

The filter circuit 1514 can be coupled to the rectifier 1516 (e.g., a half-bridge inverter, a full-bridge inverter, etc.), which can include two or more switches (e.g., transistors Q5, Q6, Q7, and Q8). The exemplary rectifier 1516 can be coupled directly or indirectly to a load 1518 (e.g., a battery). In some embodiments, a current sensor 1520 can determine (e.g., measure, sense, etc.) the characteristics of the current I3r. The current sensor 1520 can be coupled at the output of the filter 1514 and/or input of the rectifier 1516. For example, the current sensor 1520 may determine the phase of the current I3r at the input of the rectifier 1516. The sensor signal may be provided to a processor and/or controller (e.g., controller 126) for processing. In some embodiments, the processor and/or controller may generate control signals (e.g., PWM signals) for controlling one or more switches of the rectifier 1516 based on the current sensor 1520 signal(s). The processor and/or controller can provide the control signals (e.g., PWMS, PWM6, PWM7, PWM8) to one or more switches (e.g., Q5, Q6, Q7, Q8, respectively) of the rectifier 1516. In some embodiments, the current sensor 1520 can include a zero-crossing detector configured to detect zero-crossings by the current I3r. The detector signal may be provided to the controller (e.g., controller 126) to determining the control signals of the switches.

In some embodiments, the control signals may cause the rectifier switches to operate in various modes. The modes can include hard switching and soft switching (e.g., zero voltage switching). In some embodiments, the rectifier switches can operate in one mode during a first time period and operate in another mode during a second time period. In some cases, the switches may alternate between two modes during a given time period.

In some embodiments, by employing active rectification in a wireless power receiver, the tunable impedance matching components in the receiver and/or transmitter can be eliminated from the wireless power system. This can have the benefit of reducing the size, weight, and/or cost associated with the wireless power system.

Hardware and Software Implementations

In some examples, some or all of the processing described above can be carried out on one or more centralized computing devices. In some examples, some types of processing occur on one device and other types of processing occur on another device. In some examples, some or all of the data described above can be stored in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 16:
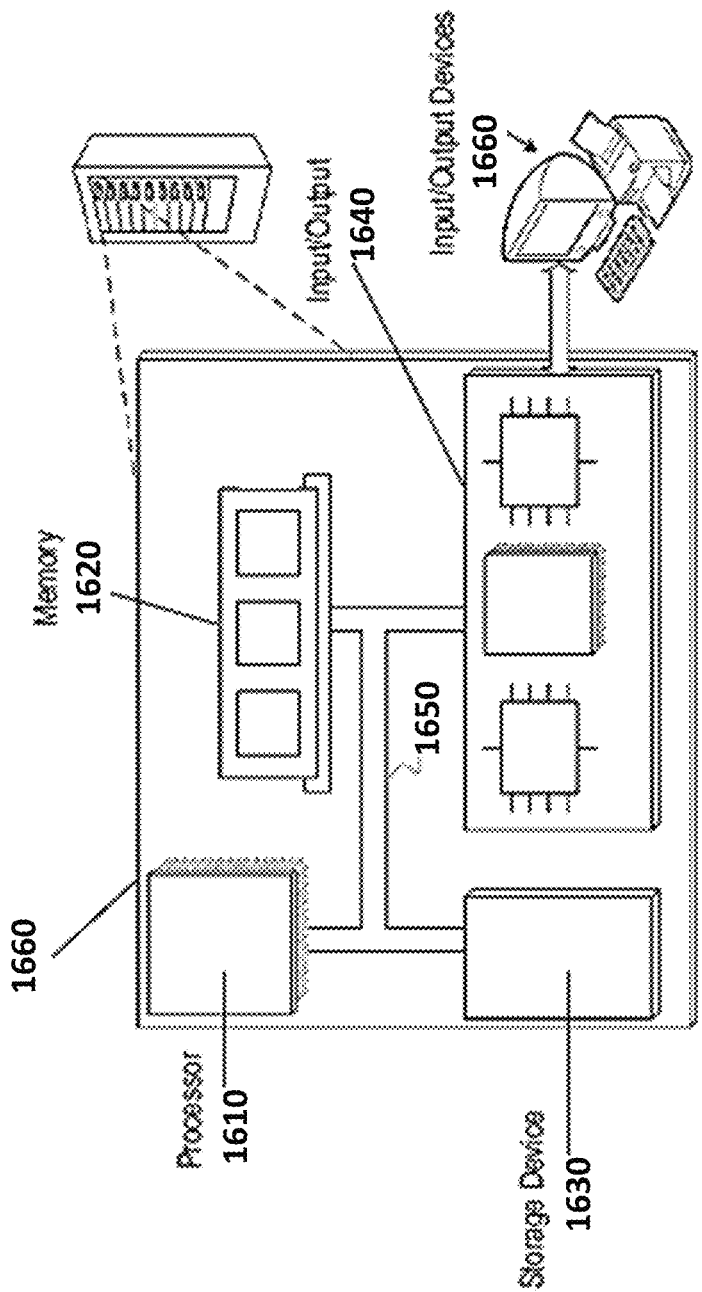
FIG. 16 is a diagram illustrating the various hardware and software components that may be used to implement the methods and systems described herein.

FIG. 16 is a block diagram of an example computer system 1600 that may be used in implementing the technology described in this document. General-purpose computers, network appliances, mobile devices, or other electronic systems may also include at least portions of the system 1600. The system 1600 includes a processor 1610, a memory 1620, a storage device 1630, and an input/output device 1640. Each of the components 1610, 1620, 1630, and 1640 may be interconnected, for example, using a system bus 1650. The processor 1610 is capable of processing instructions for execution within the system 1600. In some implementations, the processor 1610 is a single-threaded processor. In some implementations, the processor 1610 is a multi-threaded processor. The processor 1610 is capable of processing instructions stored in the memory 1620 or on the storage device 1630.

The memory 1620 stores information within the system 1600. In some implementations, the memory 1620 is a non-transitory computer-readable medium. In some implementations, the memory 1620 is a volatile memory unit. In some implementations, the memory 1620 is a non-volatile memory unit.

The storage device 1630 is capable of providing mass storage for the system 1600. In some implementations, the storage device 1630 is a non-transitory computer-readable medium. In various different implementations, the storage device 1630 may include, for example, a hard disk device, an optical disk device, a solid-date drive, a flash drive, or some other large capacity storage device. For example, the storage device may store long-term data (e.g., database data, file system data, etc.). The input/output device 1640 provides input/output operations for the system 1600. In some implementations, the input/output device 1640 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1630 may be implemented in a distributed way over a network, such as a server farm or a set of widely distributed servers, or may be implemented in a single computing device.

Although an example processing system has been described in FIG. 16, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for disconnecting a battery from a wireless power receiver, the receiver comprising (i) a rectifier coupled in parallel to an output capacitor, the capacitor being coupled between a first node and a second node at an output of the rectifier, and (ii) a first switch coupled to the input of the rectifier, wherein the receiver is coupled to a transistor coupled between the second node and a negative node of the battery, the transistor configured to reduce a current level when turned off, the receiver coupled to a disconnect circuit comprising a second switch coupled between the first node and a positive node of the battery, the method comprising the steps of:
    (a) turning off the transistor during a time when the receiver is energized such that voltage increases in the output capacitor;
    (b) closing the first switch such that the voltage at the output capacitor is at constant voltage or near-constant voltage; and
    (c) opening the second switch such that the battery is disconnected from the receiver.

2. The method of claim 1 wherein the disconnect circuit further comprises a subcircuit comprising a resistor coupled in series to a third switch, the subcircuit coupled in parallel to the second switch.

3. The method of claim 2 further comprising:
    (d) opening the third switch,
    wherein step (d) is during or after step (c).

4. The method of claim 1 wherein the disconnect circuit further comprises a fourth switch coupled between the transistor and the negative node of the battery.

5. The method of claim 4 further comprising:
    (d) opening the fourth switch,
    wherein step (d) is during or after step (c).

6. The method of claim 1 wherein step (b) is executed after step (a) and step (c) is executed after step (b).

7. The method of claim 1 wherein, before step (a), the second switch is closed, the transistor is on, and the first switch is open.

8. The method of claim 1 wherein the output capacitor is coupled to a resistor and wherein, in step (b), the resistor enables the voltage at the output capacitor to decrease.

9. The method of claim 1 wherein the transistor is coupled to a controller, the controller configured to turn off the transistor.

10. The method of claim 1 wherein the second switch is controlled by a battery management system.

11. The method of claim 10 wherein the battery management system is communicably coupled to a controller associated with the receiver.

12. The method of claim 1 wherein the transistor is a metal-oxide semiconductor field-effect transistor (MOSFET) and the first and second switches are relays.

13. A protection circuit for a wireless power receiver, the receiver comprising a rectifier coupled in parallel to an output capacitor, the capacitor being coupled between a first node and a second node at an output of the rectifier, the protection circuit comprising:

a transistor coupled between the second node and a negative node of the battery, the transistor configured to reduce a current level when turned off;

a first switch coupled across the input of the rectifier; and a disconnect circuit comprising a second switch coupled between the first node and a positive node of the battery, wherein:

(a) the transistor is configured to turn off during a time when the receiver is energized such that voltage increases in the output capacitor;

(b) the first switch is configured to close such that the voltage at the output capacitor is at constant voltage or near-constant voltage; and (c) the second switch is configured to open such that the battery is disconnected from the receiver.

14. The protection circuit of claim 13 wherein the disconnect circuit further comprises a subcircuit comprising a resistor coupled in series to a third switch, the subcircuit coupled in parallel to the second switch.

15. The protection circuit of claim 14 wherein (d) the third switch is configured to open, and wherein step (d) is during or after step (c).

16. The protection circuit of claim 13 wherein the disconnect circuit further comprises a fourth switch coupled between the transistor and the negative node of the battery.

17. The protection circuit of claim 16 wherein (d) the fourth switch is configured to open, and wherein step (d) is during or after step (c).

18. The protection circuit of claim 13 wherein step (b) is executed after step (a) and step (c) is executed after step (b).

19. The protection circuit of claim 13 wherein, before step (a), the second switch is closed, the transistor is on, and the first switch is open.

20. The protection circuit of claim 13 wherein the output capacitor is coupled to a resistor and wherein, in step (b), the resistor enables the voltage at the output capacitor to decrease.

* * * * *